United States Patent [19]
Castellano

[11] Patent Number: 5,474,318
[45] Date of Patent: Dec. 12, 1995

[54] LONG-TRAVEL REAR SUSPENSION SYSTEM FOR BICYCLES

[76] Inventor: John P. Castellano, 1509 Liberty St., El Cerrito, Calif. 94530

[21] Appl. No.: 121,607

[22] Filed: Sep. 15, 1993

[51] Int. Cl.$^6$ ............................................. B62K 25/04
[52] U.S. Cl. ................................... 280/284; 180/227
[58] Field of Search ......................... 280/281.1, 284, 280/220, 283, 275, 278, 274; 180/227

[56] References Cited

U.S. PATENT DOCUMENTS

| | | |
|---|---|---|
| 392,523 | 11/1888 | Owen . |
| 398,158 | 2/1889 | Jeffery . |
| 439,095 | 10/1890 | Becker . |
| 450,705 | 4/1891 | Surbridge . |
| 463,710 | 11/1891 | Mathews . |
| 465,599 | 12/1891 | McGlinchey . |
| 470,317 | 3/1892 | Burton . |
| 519,855 | 5/1894 | Whitaker ........................... 280/283 |
| 634,340 | 10/1899 | Harnett ............................ 280/284 |
| 739,237 | 9/1903 | Travis . |
| 1,016,042 | 1/1912 | Shelton . |
| 1,047,430 | 12/1912 | Michaelson . |
| 1,047,431 | 12/1912 | Michaelson . |
| 1,075,886 | 10/1913 | White . |
| 1,120,111 | 12/1914 | White . |
| 2,681,235 | 6/1954 | Seddon ............................. 280/283 |
| 2,756,071 | 7/1956 | Riva ................................ 280/283 |
| 3,301,575 | 1/1967 | Ryan et al. ...................... 280/275 |
| 3,877,539 | 4/1975 | Tilkens ............................ 280/284 |
| 3,982,770 | 9/1976 | Satoh et al. ...................... 280/284 |
| 4,169,512 | 10/1979 | Ishikawa et al. ................. 180/205 |
| 4,378,857 | 4/1983 | Andersson ....................... 280/283 |
| 4,744,434 | 5/1988 | Miyakoshi et al. ............... 280/284 |
| 4,789,174 | 12/1988 | Lawwill .......................... 280/284 |
| 5,121,937 | 6/1992 | Lawwill .......................... 280/284 |
| 5,332,246 | 7/1994 | Buell .............................. 280/284 |
| 5,335,929 | 8/1994 | Takagaki et al. ................. 280/283 |

FOREIGN PATENT DOCUMENTS

| | | | |
|---|---|---|---|
| 936432 | 7/1948 | France | .......... 280/283 |
| 446263 | 3/1949 | Italy . | |
| 149835 | 1/1991 | Taiwan . | |

OTHER PUBLICATIONS

Scott Nicol, Gadgets, from VeloNews, vol. 22, #9–15, seven part series on rear suspension systems, Jun. 1993.

*Primary Examiner*—Mitchell J. Hill
*Assistant Examiner*—Carla Mattix
*Attorney, Agent, or Firm*—David Pressman

[57] ABSTRACT

An improved bicycle rear suspension system comprises a main frame (20) and a swingarm (22), the former having a seat (32) and the latter having a rear wheel (34) and a pedal crankset assembly (38) mounted on it. The suspension has predetermined proportions which provide long travel, or bump absorbing motion, without exhibiting pedaling-induced motion. The swingarm (22) is hinged to the main frame (20) at a single pivot axis (24). The specified location of the pivot axis is such that the suspension is several times firmer when the rider is standing than when the rider is sitting. This pivot location also ensures that the pedaling forces applied to the swingarm (22) are substantially balanced throughout the pedal stroke. This mechanism also provides a frame geometry which can adjust to different terrain conditions. A lightweight structure for the swingarm (22) provides high strength and stiffness. The swingarm (22), when viewed from the side, presents a diamond shape divided into a plurality of triangles. The forward vertex of the diamond is at the pivot axis, and the rearward vertex is at rear axle (52). The pedal crankset assembly (38) is mounted at the bottom vertex of the swingarm (22) and a shock absorber (36) is attached to the top. The swingarm (22) with a shock absorber (36) and a seat tube (66) forms a truss structure which provides high strength and stiffness, yet is lightweight and easy to manufacture.

23 Claims, 8 Drawing Sheets

LONG-TRAVEL REAR SUSPENSION SYSTEM FOR BICYCLES

BACKGROUND

Field of the Invention

This invention relates to bicycles, specifically to an improved rear suspension system for a bicycle or other pedal-powered vehicle.

BACKGROUND

Prior Art

General

Bicycle suspension systems are so called because they flexibly suspend the weight of the rider by springs or the like acting upon the wheels, thereby providing isolation from bumps in the road or trail. During the evolution of the bicycle, there have been many attempts to provide a simple and effective rear suspension system. A resurgence of activity in this field has been prompted by the increasing popularity of dirt road and trail riding, commonly called mountain biking. A well-designed bicycle suspension can improve control and safety, as well as comfort, by keeping the tires in contact with the ground on rough terrain. Front-wheel suspensions are commonly available, but rear suspension systems have not been widely available because they are problematic, for reasons explained below.

Problems with Prior-Art Rear Suspensions

Many suspension systems have been tried on bicycles, and all have flaws. When pedaled, most suspensions exhibit a defect known as "squat". This term is often applied to motorcycles, where the rear of the motorcycle moves down or "squats" when the throttle is suddenly opened and the vehicle accelerates. Various devices have been employed on motorcycles to solve this problem. In bicycles, squat occurs when the rear of the bicycle moves down during each pedal power stroke, causing a bobbing motion. When pedaled, especially from a standing position, many of these bicycles feel sluggish due to pedaling energy being absorbed by the squat of the suspension.

Other problems with prior-art suspensions are that often the suspensions appear to be either too flexible, too heavy, or too complex. Most systems do not make use of the rider's legs for damping the suspension motion. Also suspension motion, or travel, must be limited to keep the pedals from hitting the ground. On many of these designs, the distance between the rear axle and the pedal crankshaft varies as the suspension acts. This causes such problems as changes in suspension action, depending on which drive gear is selected; pedal kickback upon rear wheel impact; and overtaxing of the rear derailleur's tensioning capacity, which can lead to breakage.

The Problem of Squat

The squat of bicycle suspensions is a problem because the bobbing motion can absorb pedaling energy. Because bicycles have a limited energy source, any loss of energy to squat is a serious hinderance. The bobbing motion can also be unpleasant to the rider. A suspension which resists pedaling-induced actuation is said to possess anti-squat characteristics.

Squat occurs in bicycles because pedal and chain forces vary throughout the pedal stroke. This causes variations in the propulsive force or tire thrust force. The cyclically varying tire thrust in turn causes a cyclically varying weight transfer to the rear tire. These force variations can cause undesirable suspension motion. Also, the rider's center of gravity moves up and down, especially when pedaling from a standing position. This can also cause the suspension to bob. The challenge is to devise a simple mechanism which balances these forces under all riding conditions. Then the suspension will not react to pedaling, yet will remain fully active to do its primary job. Prior-art suspension systems have not succeeded in achieving full anti-squat action without resorting to complicated linkage suspension systems.

Types of Prior-Art Rear Suspensions

Most rear suspensions can be divided into two general types: Those with a fixed pedal crankshaft and those with a swinging pedal crankshaft.

In the former type, which is common today, the front fork, the seat, and the pedal crankshaft are all mounted on the main frame of the bicycle, and the rear wheel is mounted on a swinging arm (swingarm) which is hingedly attached to the main frame. This type is known as fixed pedal crankshaft because the location of the pedal crankshaft is fixed with respect to the main portion of the frame.

In the other type of suspension the pedal crankshaft is mounted on the swingarm. This type is known as swinging pedal crankshaft because both the pedal crankshaft and the rear wheel swing as a unit, with respect to the main frame. The main frame holds the seat and front fork. This type was more common a century ago than it is today.

The problems with both types of prior-art suspension systems are detailed below.

Bicycles where the swingarm pivot coincides with the pedal crankshaft can be characterized under either or both types. There are other suspensions which don't fit into either of these categories, such as various yieldable seat mounting devices and bicycles with the seat mounted on the swingarm, but these are not directly relevant.

Prior-Art Bicycles with Fixed Pedal Crankshaft

Perhaps the simplest rear suspension is to mount the rear wheel on a swingarm pivotably mounted to the rest of the bicycle. On first glance, a logical place to pivot the swingarm on such a bicycle is at or near the pedal crankshaft so chain tension doesn't vary as the rear wheel swings. An early example of this type of suspension is seen in U.S. Pat. No. 398,158 to Jeffery (1889). A currently available example of this type of bicycle is sold under the trademark Manitou FS by Answer Products of Valencia, Ca. The problem with bicycles using this suspension system is that they squat cyclically on each power stroke. This is because the weight transfer and chain forces are not adequately balanced by the tire thrust force, as mentioned above.

In an attempt to solve squat, many modern suspension bicycles move the swingarm pivot up above the pedal crankshaft. An example is sold under the mark Defiant by Boulder Bicycles of Lyons, Co. With the pivot raised, chain force can be used to counteract weight transfer instead of compounding it. Having a derailleur-type gearing system with a built-in tensioner facilitates this arrangement. The problem with this configuration is that the front derailleur is located where the pivot should be for proper force balancing. Because of this, the pivot has to be raised even further or moved forward to avoid interference with the derailleur. If it is placed above the front derailleur, it is too high to correctly balance the forces. The bicycle now rises on each pedal stroke, due to the chain force extending the swingarm. This is as undesirable as squat. Another problem with this configuration is that the pedals kick back when the wheel encounters an obstacle. These problems are exacerbated when a small front sprocket, or chainring, is one of the gears selected by the rider. Also, maximum travel must be limited to avoid overtaxing the rear derailleur's tensioning capacity. If the pivot is placed in front of the derailleur, instead of above, the problems are lessened but not eliminated.

With a four-bar-linkage suspension, such as shown in U.S. Pat. No. 4,789,174 to Lawwill (1988), a virtual pivot axis for the rear wheel can be put at the optimum position to achieve anti-squat. However this type of system tends to be heavy, complicated to manufacture, and prone to wear because of the high number of pivots.

All of the above systems typically suffer from lack of swingarm rigidity, which detracts from drivetrain efficiency and from handling. Often, an upper guide is employed on the swingarm in an attempt to regain lateral rigidity. In another approach, the motorcycles shown in U.S. Pat. Nos. 3,877,539 to Tilkens (1975) and 4,744,434 to Miyakoshi etal. (1988) employ swingarms with various triangular portions, but even these are not fully braced for lateral and torsional loads. Suspension travel must be restricted to prevent the pedals from hitting the ground. Also, because suspensions of this type are only slightly firmer at the pedals than at the seat, they tend to sag on each stroke of the pedals when the rider is standing. This standing squat is a reaction to the up-and-down motion of the standing rider. The energy lost to the suspension makes these bicycles feel sluggish when pedaling in a standing position. Even so, many current suspension bicycles employ this type of system for its simplicity. Republic of China patent 149,835 to Liau (1991) shows a motorcycle with a dual-rate suspension where the travel and spring compliance of the seat is higher than the travel and spring compliance for the rest of the motorcycle, including the footpegs. If used on a bicycle, this would reduce squat when the rider is standing, however no mechanism or concept is disclosed which would provide anti-squat action for the sitting rider.

Prior-Art Bicycles with Swinging Pedal Crankshaft

In another type of bicycle the pedal crankshaft is mounted on the swingarm, while the front fork and the seat are mounted on the main frame. The main problems with bicycles of this type are that the location of the swingarm pivot and the structure of the swingarm have not been optimized for highest performance.

An early example of this swinging-pedal-crankshaft type of suspension is seen in U.S. Pat. No. 392,523 to Owen (1888). This bicycle has a swingarm in the shape of an inverted "U", looping from the rear axle up and forward to the pivot, then down to the pedal crankshaft housing. Owen emphasized that the pivot should be placed along the line between the seat and pedal crankshaft so "the distance between the saddle and pedal remains practically unchangeable". U.S. Pat. NO. 450,705 to Surbridge (1891) discloses a bicycle very similar to Owen's.

There are several problems with these designs. First, if used on a multi-speed bicycle, with the pivot placed this far back, the anti-squat performance varies, depending upon which drive gear is selected. These bicycles squat in high gears, especially when the rider is standing and pedaling. Secondly, compared with most other systems, there is even less suspension travel available before the pedals hit the ground. Also, these designs lack good lateral and torsional rigidity, thereby adversely affecting wheel alignment, which is essential for good handling.

A similar system with a different construction is used for the "bicycle or light motorcycle" of U.S. Pat. No. 2,756,071 to Riva (1956). In an attempt to obtain shock absorption at both wheels, the pivot is placed "in front of the plane passing through the saddle and the pedal gear axis". However, the pivot is too far back to give the desired soft-when-sitting/firm-when-standing suspension action, so this suspension also squats under standing pedaling loads. Also, the swingarms are not well-braced for vertical and lateral wheel loads.

Similar designs, but with lower pivot locations, are seen in the bicycles described in U.S. Pat. No. 463,710 to Mathews (1891) and U.S. Pat. No. 465,599 to McGlinchey (1891). More recent are the bicycle or motor bicycle in Italian patent 446,263 to Ciclo Moto (1949), the "bicycle or moped" in U.S. Pat. No. 3,982,770 to Satoh et al. (1976), and the moped in U.S. Pat. No. 4,169,512 to Ishikawa etal. (1979). In these designs, the pivot is placed a short distance in front of the pedal crankshaft and, in some cases, slightly higher than the pedal crankshaft. The problem with all of these is that the pivot is too low, so these suspensions squat on each pedal power stroke, regardless of gear selection. The swingarms in these designs also lack good bracing, although the moped has several members attached between the swingarm sides to improve rigidity. The swingarm of the Ciclo Moro bicycle is diamond shaped in side view, which is good for vertical loads. However, the swingarm disclosed is not well-braced for resisting lateral loads. The only way to achieve adequate rigidity with these designs is to use thick frame members, which makes them heavy, a highly undesirable characteristic for a bicycle.

Attempts to reduce torsional and lateral flexing of the rear wheel are seen in the "velocipede" disclosed in U.S. Pat. No. 439,095 to Becker (1890), the "bicycle" in U.S. Pat. No. 739,237 to Travis (1903), the "velocipede" of U.S. Pat. No. 1,016,042 to Shelton (1912), and the "motor cycle or bicycle frames" shown in U.S. Pat. Nos. 1,047,430, and 1,047,431, both to Michaelson (1912). In these designs, the pivot is also in front of the pedal crankshaft and/or just above, but there is an additional device at the top of the swingarm to preclude lateral movement. Two have telescopic guides, two have pivoted links, and one has a leaf spring. These devices provide limited improvement in torsional rigidity, but add weight and complexity. Shelton's has the main pivot above and several centimeters in front of the pedal crankshaft, and reports some reduction of "movements imparted to the frame by the action of pedaling.." However on all of these, the pivot is too low for complete cancellation of forces and optimum anti-squat performance.

Pivot locations farther forward than in the above systems are employed in the "motor bicycle" described in U.S. Pat. No. 1,075,886 to White (1913), and in U.S. Pat. No. 1,120,111 also to White (1914), intended for use in "motor bicycles or ordinary bicycles". In these, the pivot is forward, near the lower front extreme of the engine. Again the pivot is too low for anti-squat, and the sliding link, which is used to get the necessary rigidity, adds complexity.

When the pivot is placed forward, the suspension is firmer for the standing rider, which can improve performance when the rider is pedaling hard. However, this can be overdone, and this is the case in U.S. Pat. No. 470,317 to Burton (1892), a "velocipede frame", and U.S. Pat. No. 3,301,575 to Ryan et al. (1967) intended for "bicycles... light motorcycles or other vehicles". These swingarms are pivoted very far forward, at the head (steering) tube. While the pivot height is approximately correct for anti-squat, the extreme forward placement makes the suspensions very firm when standing. These suspension systems function only when seated and transmit excessive shock to the rider's feet. The former uses a telescopic device for rigidity, adding complexity. The latter has a long swingarm which lacks any bracing and would not provide enough rigidity for good high-speed handling.

In summary, all prior suspensions of the swinging-pedal-crankshaft type exhibit problems with either squat, flexibility, or weight. I believe this is due to the fact that their pivots are too far back, or too far forward, and/or too low. Also, none of the prior suspensions of this type have a frame structure ideal for bicycles.

OBJECTS AND ADVANTAGES

Accordingly several objects and advantages of the present invention are to provide an improved rear bicycle suspension, to provide a suspension which has long travel, and to provide a suspension which responds minimally to the cyclical loads associated with pedaling regardless of riding position or gear selection, i.e., it has greatly reduced squat.

An additional object is to provide a bicycle with a truss structure which is lightweight, stiff, and easily fabricated.

A further advantage is to provide a bicycle which exhibits favorable changes in frame geometry as the seat height is adjusted and as the suspension acts.

Still further objects and advantages will become apparent from a consideration of the drawings and ensuing description.

LIST OF REFERENCE NUMERALS

Figure 1:
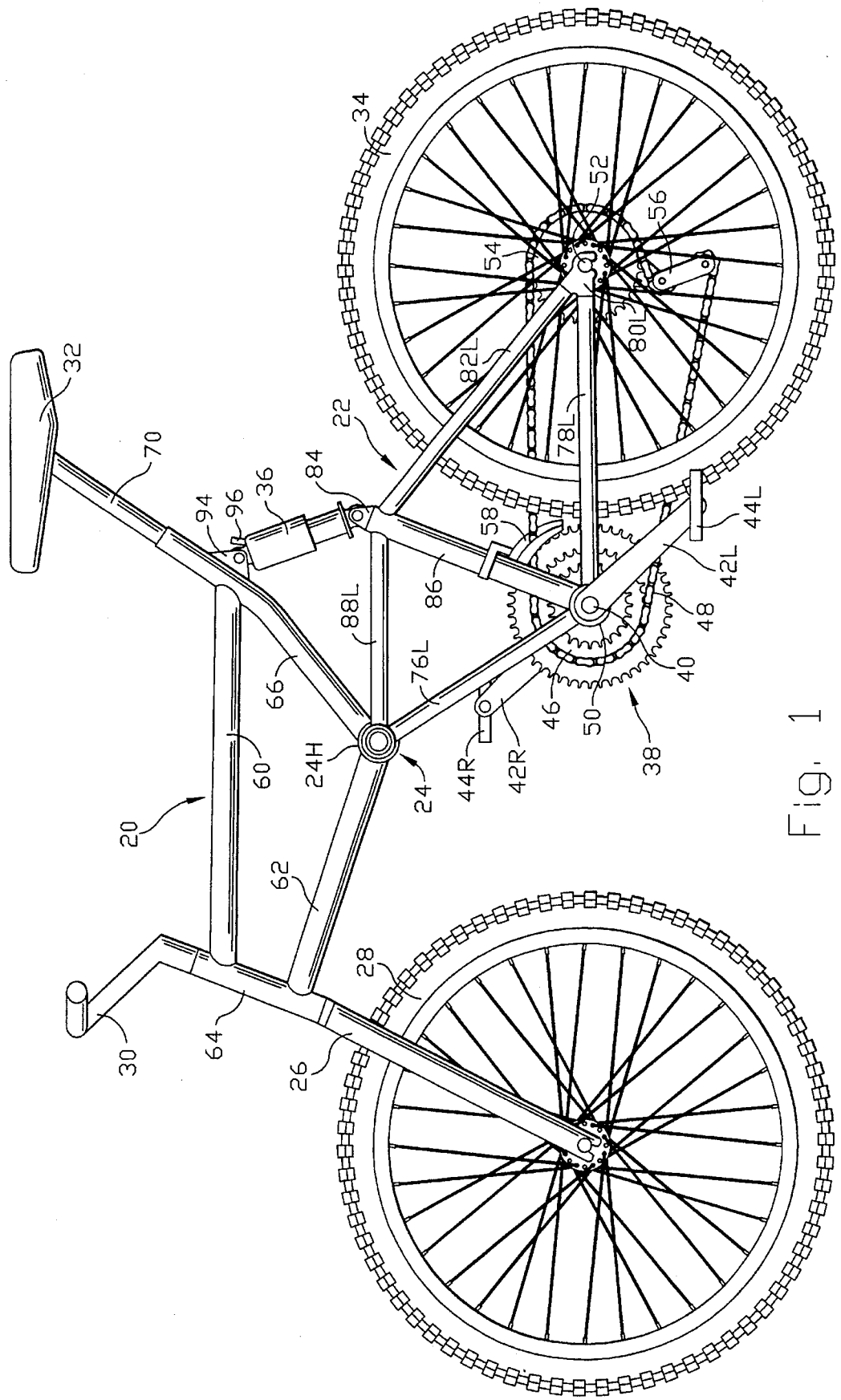
FIG. 1 is a side elevation view of a bicycle according to my invention.

| 20 | main frame | 20' | alternative main frame |
|----|-----------|-----|----------------------|
| 22 | swingarm | 22' | flexure-mounted swingarm |
| 23 | alternative swingarm | | |
| 24' | flex-pivot assembly | 24 | pivot assembly |

-continued

LIST OF REFERENCE NUMERALS

| 24BL | left swingarm bearing | 24BR | right swingarm bearing |
|------|----------------------|------|------------------------|
| 24S | pivot shaft | 24H | pivot shaft hanger |
| 24VL | left pivot sleeve | 24VR | right pivot sleeve |
| 28 | front wheel | 26 | front fork |
| 32 | seat | 30 | handlebars |
| 36 | shock absorber | 34 | rear wheel |
| 40 | pedal crankshaft | 38 | pedal crankset assembly |
| 42L | left crankarm | 42R | right crankarm |
| 44L | left pedal | 44R | right pedal |
| 48 | chain | 46 | chainrings |
| 52 | axle of rear wheel | 50 | pedal crankshaft housing |
| 56 | rear derailleur | 54 | sprockets |
| 60 | top tube | 58 | front derailleur |
| 62 | down tube | 60' | enlarged top tube |
| 66 | seat tube | 64 | head tube |
| 68 | setscrew | 66' | alternative seat tube |
| 76R | right lower pivot stay | 70 | seatpost |
| 78R | right chainstay | 76L | left lower pivot stay |
| 80R | right dropout | 78L | left chainstay |
| 82R | right backstay | 80L | left dropout |
| 82L' | alternative backstay | 82L | left backstay |
| 86 | tubular strut | 84 | lower shock mount |
| 88R | right upper pivot stay | 86' | alternative strut |
| 88L' | flexible upper stay | 88L | left upper pivot stay |
| 89L | left combined stay | 89R | right combined stay |
| 94 | upper shock mount | 92 | longitudinal stay |
| 98 | flexible lower stay | 96 | air valve |

SUMMARY

The present invention provides a bicycle rear suspension system comprising a main frame and a swingarm, the former having a seat and the latter having a rear wheel and a pedal crankset assembly mounted on it. The suspension has predetermined proportions which provide long travel without exhibiting pedaling-induced motion. The swingarm is hinged to the main frame at a single pivot axis. The location of the pivot axis is chosen so that the suspension is several times firmer when the rider is standing than when the rider is sitting. The pivot location also ensures that the pedaling forces applied to the swingarm are substantially balanced throughout the pedal stroke. This mechanism also provides a frame geometry which can adjust to different terrain conditions. A lightweight structure for the swingarm provides high strength and stiffness. The swingarm, when viewed from the side, presents a diamond shape divided into a plurality of triangles. The forward vertex of the diamond is at the pivot axis, and the rearward vertex is at the rear axle. The pedal crankset assembly is mounted at the bottom vertex of the swingarm and the shock absorber is attached to the top. The swingarm combines with the shock absorber and the main frame to form a truss structure which provides high strength and stiffness, yet is lightweight and easy to manufacture.

General Description of the Preferred Embodiment—FIG. 1

FIG. 1 shows a side elevational view of the preferred embodiment of a bicycle with a frame according to my invention. The frame has two parts, a main, upper, or forward frame portion 20 and a swingarm, lower, or rear frame portion 22. Both are swingably connected together at a pivot assembly 24. Frame portions 20 and 22, and pivot assembly 24 will be described in detail below. A front fork 26 is mounted to the front of main frame portion 20 on bearings, not shown, to allow the bicycle to be steered, in a manner well known in the art. A front wheel 28 and a set of handlebars 80 are attached to fork 26 in the conventional manner. Fork 26 may incorporate a front wheel suspension, not shown, if desired. A seat 382 is secured to the rear of main frame portion 20.

Swingarm frame portion 22 (hereinafter usually "swingarm") extends rearwardly from main frame portion 20 and pivot 24. A rear wheel 84 is mounted to the end of the swingarm. Swingarm 22 is positioned and controlled by a spring-loaded shock absorber 86 which is pivotably attached to swingarm 22 at a pivot point adjacent a lower shock mount 84 and to main frame portion 20 at a pivot adjacent an upper shock mount 94. A pedal crankset assembly 88 is also mounted on swingarm 22 in front of rear wheel 84. The front and rear wheels rotate conventionally, i.e., parallel to an imaginary, vertical, fore-and-aft plane when the bicycle is travelling in a straight line.

Pedal crankset assembly 88 comprises a pedal crankshaft 40, a pair of crankarms 42R (right) and 42L (left) a pair of foot pedals 44R and 44L, and one or more chainrings 46. Chainrings 46 engage a continuous chain 48 to drive rear wheel 84, as is common in the art. Pedal crankshaft 40 rotates on bearings, not shown, in a pedal crankshaft housing 50.

Rear wheel 34 rotates on a rear axle 52 which is secured to swingarm 22. Mounted to the rear wheel are a plurality of successively larger sprockets 54, only one of which is shown, to engage chain 48. The sprockets are mounted on a freewheel or one-way clutch, not shown, to allow coasting. A rear derailleur 56 and a front derailleur 58 shift chain 48 to select the drive ratio or gear. A derailleur type system is depicted here because it is the most common, although any type of drive system may be employed with my suspension system.

Main Frame Portion—FIG. 1, 2

In FIG. 1, main frame portion 20 (hereinafter usually "main frame") comprises a top tube 80, a lower or down tube 62, a head tube 64, a seat tube 68, and a pivot shaft holder or hanger 24H. Top tube 60 is positioned longitudinally, forming the top of main frame 20. The forward end of top tube 60 is attached to head tube 84, which carries the bearings for front fork 28.

Below the top tube, down tube 62 extends downwardly and rearwardly from head tube 84 and is rigidly attached to pivot shaft hanger 24H. This area of main frame 20 can be seen in detail in FIG. 2.

Figure 2:
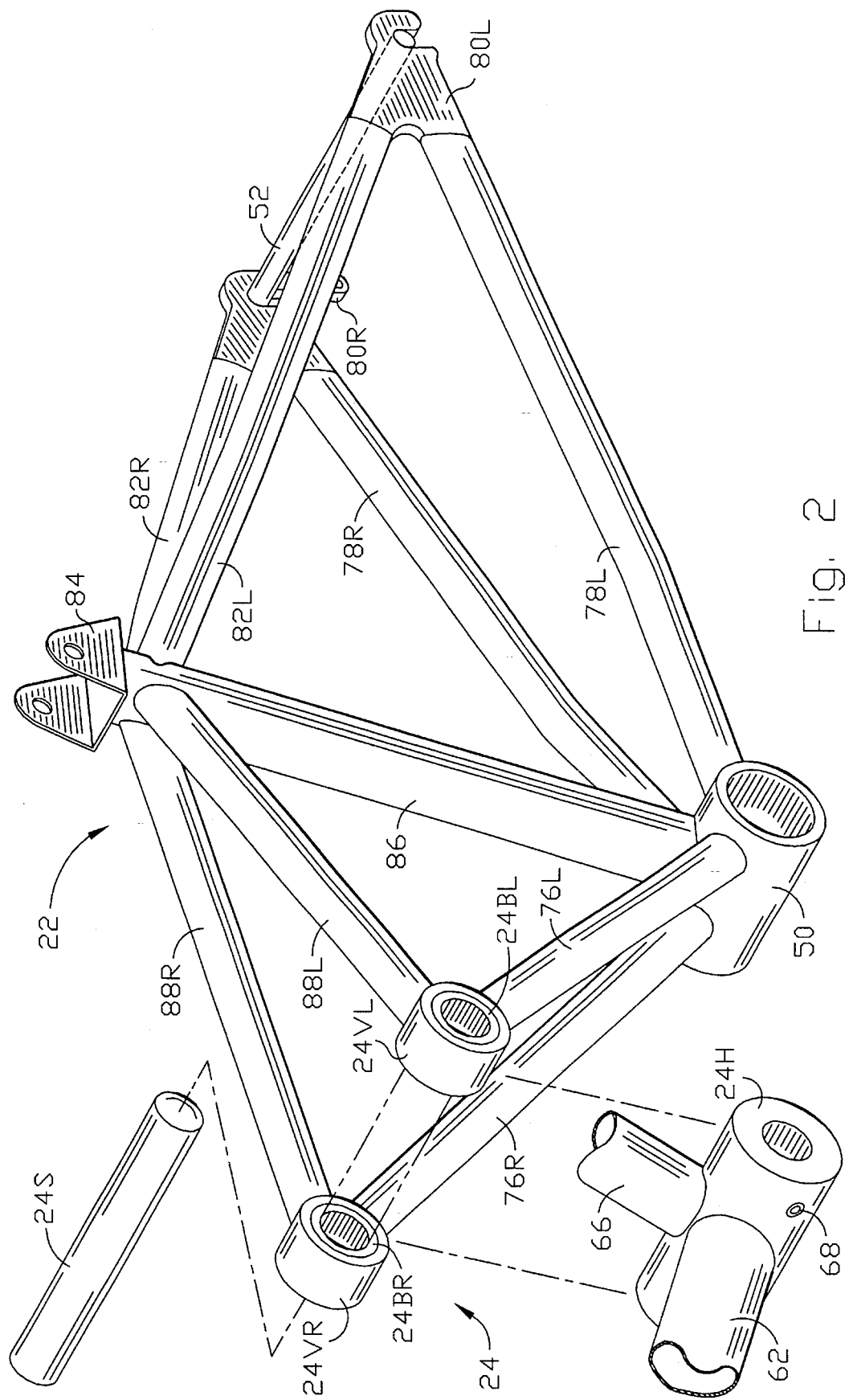
FIG. 2 is an isometric view of a preferred form of swingarm used in this bicycle, showing a tetrahedral framework and details of the pivot assembly.

The purpose of pivot shaft hanger 24H is to rigidly and fixedly hold a pivot shaft 24S. In FIG. 2, shaft 24S and hanger 24H are shown removed from swingarm frame portion 22 as indicated by the projection lines. The normal position of shaft 24S is shown in phantom. Pivot shaft hanger 24H is a thick walled tube, similar in size and shape to a conventional pedal crankshaft housing, and is attached to down tube 62 and seat tube 66 in a similar manner. More details of pivot assembly 24 will be discussed below.

Returning to FIG. 1, seat tube 88 extends upwardly and rearwardly from hanger 24H and is attached, near its upper end, to the rear end of top tube 60. Seat tube 66 may have a bend in it, as shown, or it may have a welded joint instead. It may alternatively be a straight tube.

Seat 32 is attached to a seatpost 70 which is clamped into the upper end of seat tube 66, as is common practice. Main frame 20 resembles the forward part of a conventional unsuspended bicycle, except that the tube angles and lengths are different and pivot assembly 24 is at a junction of tubes at which the pedal crankshaft would normally be mounted. Thus any method of construction suitable for bicycles may be used to assemble the frame. However all tubes are preferably welded together at their Junctions.

Pivot Assembly—FIGS. 1, 2

The swingarm is flexibly mounted to swing with respect to main frame 20. Preferably a pivot is used as a hinge, although a flex-pivot or flexure (flexible member or members) may be used instead, as will be described later. Pivot assembly 24 is shown in FIG. 1 as four concentric circles. FIG. 2 is a more detailed view with the pivot components individually numbered.

In FIG. 1, the outermost circle is the outer edge of pivot shaft hanger 24H, which is part of main frame 20. The second largest circle is the outer edge of a pivot sleeve 24VL which is part of swingarm 22. The third largest circle is the outer edge of a swingarm bearing 24BL which is pressed into sleeve 24VL. On the other side of the bicycle are another pivot sleeve 24VR and another bearing 24BR. The innermost circle is the end of pivot shaft FIG. 2 shows a closer view of pivot assembly 24, partially disassembled. Shaft 24S has been slid out from its normal position (shown in phantom) and pivot shaft hanger 24H has been moved aside from its normal position between sleeves 24VR and 24VL, as indicated by the projection lines. Pivot shaft hanger 24H is similar to a conventional pedal crankshaft housing, however instead of being threaded on the inside, it has a smooth hole. The inside diameter is sized to closely fit pivot shaft 24S. Hanger 24H has one or more set screws 68 to rigidly lock shaft 24S to main frame 20. Other locking devices can be used instead of a setscrew.

The swingarm is journaled to rotate about pivot shaft 24S on swingarm bearings 24BR and 24BL which are pressed into pivot sleeves 24VR and 24VL. Several different types of bearings may be used here, although a sleeve bearing is the simplest. Thrust washers, not shown, between hanger 24H and sleeves 24VR and 24VL, preclude axial movement of the swingarm.

Pivot shaft 24S may be hollow for lightness. Also its ends may be threaded, and bolts or nuts added to hold outer thrust washers, if desired, to prevent outward movement of sleeves 24VR and 24VL.

Pivot assembly 24 (hereinafter usually "pivot") enables swingarm 22 to pivot, with respect to the main frame portion, about an axis which is perpendicular to an imaginary, vertical, fore-and-aft plane.

Swingarm Portion—FIGS. 1, 2

Swingarm portion 22 connects pivot 24, pedal crankshaft housing 50, rear axle 52, and shock absorber 36 as shown in FIG. 1. The structure of swingarm 22, viewed from the side, is diamond shaped and is divided into two triangular subportions. FIG. 2 shows an isometric view of swingarm 22.

Rigidly attached to pivot sleeves 24VR and 24VL are a pair of lower pivot stays 76R and 76L, which extend downwardly to pedal crankshaft housing 50. These stays may have a short bridge tube, not shown, extending between them for added bracing.

The front ends of a pair of tubular chainstays 78R and 78L are attached to pedal crankshaft housing 50. The front ends of the chainstays may be bridged by a small tube, not shown, as is common in bicycle frames for added bracing. The rear ends of chainstays 78R and 78L are attached to a pair of small plates or dropouts 80R and 80L. Rear axle 52 is fastened to the dropouts in the usual manner, although the fasteners are not shown here.

Rear derailleur 56 is mounted to the right dropout 80R. A pair of backstays 82R and 82L rises forwardly from the dropouts to lower shock mount 84. A tubular strut 86 connects from mount 84 downwardly to pedal crankshaft housing 50, dividing the diamond shape of the swingarm frame portion into a forward triangular subportion and a rearward triangular subportion.

Front derailleur 58 is mounted on strut 86. A pair of upper pivot stays 88R and 88L extend from lower shock mount 84 forwardly to pivot sleeves 24VR and 24VL. Swingarm 22 has the best shape contemplated by me for this structure.

Stays 76R, 76L, 78R, 78L, 82R, 82L, 88R, and 88L are preferably tubular elongated members. The construction of swingarm 22 is similar to the rear ends of two conventional diamond frames connected together at strut 86. Also, main frame 20 is like a conventional frame with the rear triangle removed. Because of these similarities to conventional frames, this embodiment may be easily manufactured by any bicycle manufacturer. Also, any conventional bicycle braking system, not shown, may be used on swingarm 22.

Figure 3:
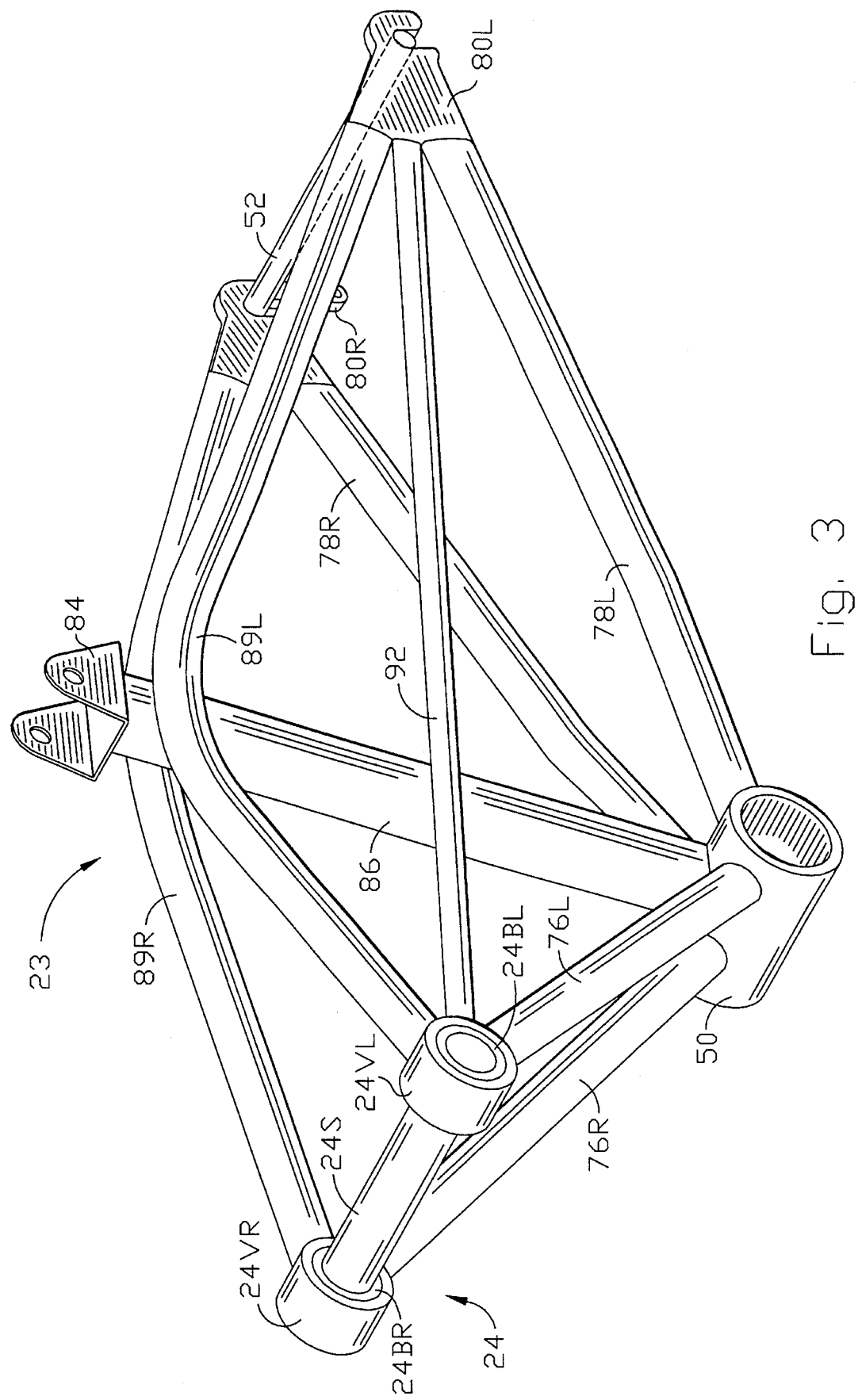
FIG. 3 shows a similar view of an alternative swingarm design.

Alternative Swingarm—FIG. 3

An alternative swingarm design is shown in FIG. 3. Here an alternative swingarm 23 is shown which is similar to the one in FIG. 2 with the addition of a longitudinal member or stay 92 extending from a point near left pivot sleeve 24VL to a point near left dropout 80L. Also backstay 82R and upper pivot stay 88R have been replaced by a right combined stay 89R, made from a single piece of tubing. Stay 89R is welded to the side of strut 86. Similarly, a left combined stay 89L is welded to the opposite side of strut 86, as shown, for ease of manufacture. Combined stays 89R and 89L each have a forward and upper segment from strut 86 forward, and a rearward and lower segment from strut 86 rearward. Although swingarm 23 shows both a longitudinal member and combined stays, as described, either of these two alternative features can be incorporated into the swingarm independently of the other.

Shock Absorber—FIG. 1

Returning now to FIG. 1, spring-loaded shock absorber 36 is fastened at its base to lower shock mount 84, and at its top to upper shock mount 94, on seat tube 66. Shock absorber 36 may employ any type of spring and preferably has damping capability. Preferably shock absorber 36 is an air shock, as shown, which incorporates an air spring and an oil damper into a single piston/cylinder arrangement. An air valve 96 allows the pressure in the air spring to be adjusted. Alternatively, shock absorber 36 may contain a coil spring with an oil-filled damper. Or an elastomer spring, either solid or foam, may be utilized, combining springing and damping functions. Many other combinations are possible. Shock absorbers designed specifically for bicycles are now commercially available from several sources. The best mode presently preferred by me is an air shock, such as one sold under the trademark *Genesis Damper* by Risse Racing Technology of Sunnyvale, CA. This shock absorber is available with a variety of travel lengths. A model with a 6 cm travel is shown.

The upper and lower shock mounts 94 and 84 shown in FIG. 1 are brackets which connect the frame members to the bolts which fasten shock absorber 36. Other types of mounts may be employed. For example, if an elastomer spring is used, shock mounts 84 and 94 should be cupped washers bearing directly upon the spring material.

Pivot Location—FIG. 1

The location of pivot 24 (FIG. 1), is important to achieving the full benefits of the suspension, as will be explained in detail below. Both pivot height and fore/aft or longitudinal position are important. For a medium-sized frame with a seat height of approximately 102 cm, the preferred height of pivot 24 is approximately 58 cm above the ground for reasons explained below. The ideal fore/aft location of pivot 24 is such that, as the suspension acts, the vertical travel of seat 32 is 1.7 to 4.0 times the vertical travel of pedal crankshaft 40. A method for calculating the ideal fore/aft pivot position is given later in the Theory of Operation section.

Other miscellaneous parts of the bicycle are well known, commonly available, and not directly relevant to the current suspension. Therefore they are omitted for clarity.

Figure 4:
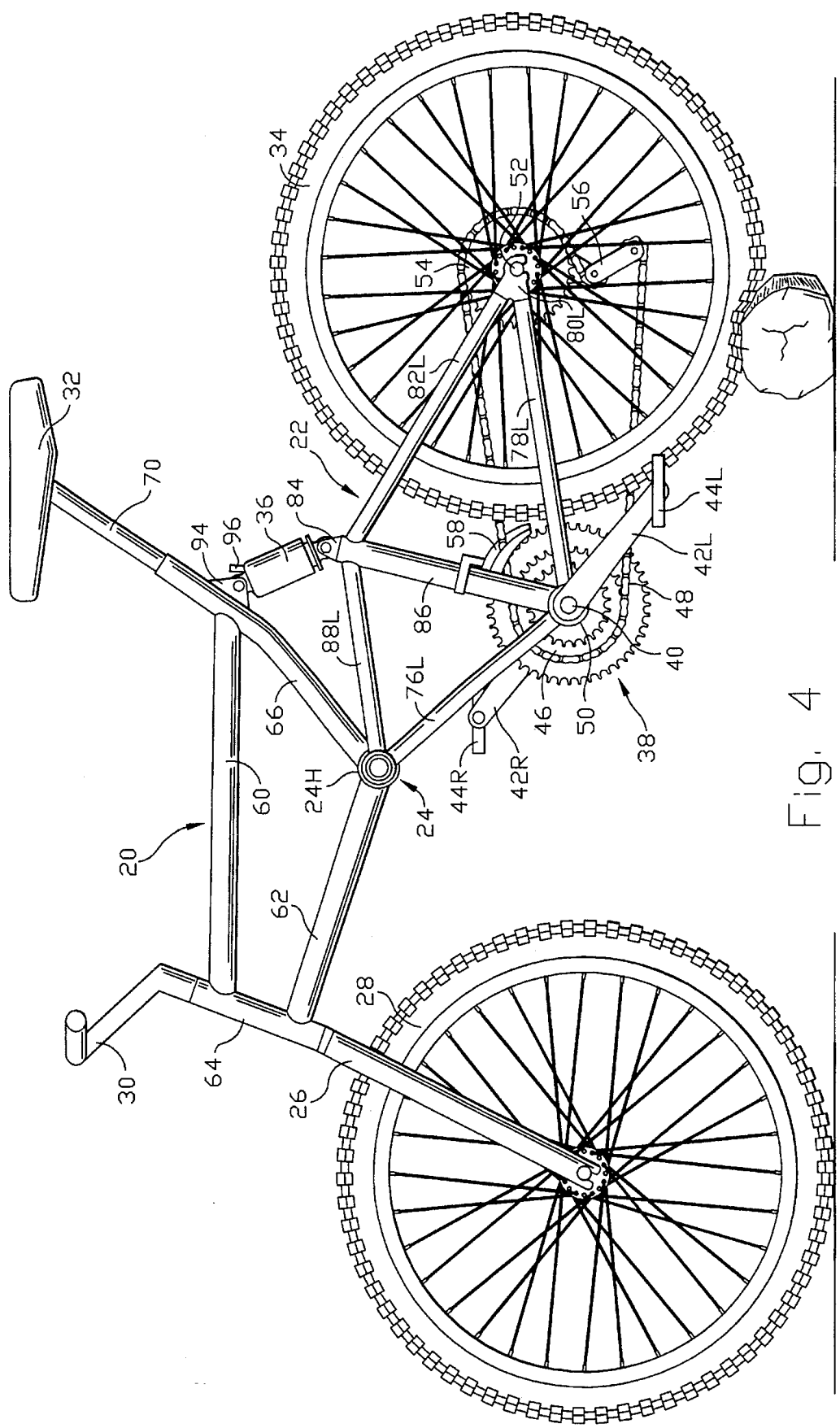
FIG. 4 shows a side view of the suspension encountering a rock.

Operation—FIGS. 1, 4

The purpose and function of standard parts, such as seat 32 (FIG. 1), seatpost 70, fork 26, front wheel 28, handlebars 30, derailleurs 58 and 58, chain 48, and sprockets 54 are well known in the art. The operation of pedal crankset assembly 38, and its crankarms 42R and 42L, pedals 44R and 44L, and chainrings 48, is also well known. These are not discussed further, except as they relate directly to my suspension.

When the bicycle is in use and rear wheel 34 encounters a bump or rock, as shown in FIG. 4, rear wheel 84, and hence swingarm 22, is deflected upwardly, causing shock absorber 36 to be compressed. Swingarm 22 rotates about pivot 24. The axis of pivot 24 is perpendicular to the fore-and-aft vertical plane. Rear wheel 34 and swingarm 22 are sprung and damped by the spring-loaded shock absorber. It can be appreciated that even when rear wheel 34 is moving vigorously up and down, its axle 52 remains at a constant distance from pedal crankshaft 40. This is because pedal crankshaft housing 50 and dropouts 80R and 80L are rigidly connected by chainstays 78R and 78L, unlike some types of prior suspensions where there is a pivot included in this connection. In addition to the structural advantages discussed later, my arrangement offers several operational advantages because it maintains constant spacing between rear axle 52 and pedal crankshaft 40, unlike other anti-squat suspensions where the spacing varies.

First, if a derailleur-type drivetrain is used, the rear derailleur's tensioning capacity is not affected by suspension motion, allowing longer wheel travel and use of wider-ratio gears. Alternately, if a non-derailleur drivetrain is used, the constant spacing eliminates any need for a chain tensioner. A shaft drive is even possible with this swingarm.

Secondly, the suspension action is not affected by the diameter of chainring 46 because all loads on chain 48 are distributed directly to swingarm 22. Maintaining a constant spacing between axle 52 and pedal crankshaft 40 also prevents the type of squat known as "inchworming" which occurs on some other suspensions, mostly when using a small diameter chainring. This occurs because the tension in chain 48 is highest when using the smallest chainring, and the low chain angle tends to extend the swingarm on each power stroke. However in my suspension, pedal crankset assembly 38 is mounted directly on swingarm 22, so there is no net pull on the swingarm from the chain. This keeps anti-squat action and suspension behavior independent of chainring diameter.

Finally, with this system, the pedals do not kick back when the bicycle encounters a bump, as they would if the distance between rear axle 52 and pedal crankshaft 40 were to suddenly increase upon hitting a bump.

The key features of this suspension mechanism, which distinguish it from prior-art suspensions, are a carefully selected pivot location and a well-braced structure which embodies the desired pivot location. Both fore/aft position and height of the pivot are important. The preferred pivot location produces unique geometrical effects, favorable dynamic behavior, a soft-when-sitting/firm-when-standing suspension action, and substantially no squat when pedaling. The attainment of each of these advantages is discussed in detail below.

Structural Considerations—FIGS. 1, 2

For a bicycle to handle well and transmit pedal power efficiently, its frame must be strong and stiff. The wheels should be held in alignment and the frame should not flex excessively due to loads on the pedals and chain. The frames of many suspension bicycles violate these tenets. My preferred embodiment provides a stiff, light, simple structure which accomplishes these objectives.

In FIG. 1, it can be seen that main frame 20 is very similar structurally to the front part of a conventional diamond frame. Head tube 64 performs its usual function of supporting the fork bearings to allow steering. Top tube 60, down tube 82, and seat tube 88 form an approximately triangular structure which has been adequately proven through common use. The load transmitted into main frame 20 at upper shock mount 94 is very similar to the load from the seatstays in a conventional diamond frame.

Pivot shaft hanger 24H is attached to both seat tube 88 and down tube 82, providing a rigid and strong mounting for pivot shaft 24S which is held in place by setscrew 68. The mounting of hanger 24H is similar to the conventional mounting of the pedal crankshaft housing in a diamond frame, and sustains similar loads. Pivot shaft 24S extends from both sides of hanger 24H.

As shown in FIG. 2, swingarm bearings 24BR and 24BL encircle and journal the end portions of pivot shaft 24S to provide the widest spacing for the swingarm bearings. The bearings may alternatively be mounted inboard, within pivot shaft hanger 24H, and journal the central portion of pivot shaft 24S, however this increases bearing loads.

Truss Structure—FIG. 1

When a bicycle encounters bumps, the primary structural loads act in the central plane of the frame. A conventional bicycle frame has a front triangle adjoining a rear triangle, providing good bracing for these in-plane loads. As can be appreciated from FIG. 1, the preferred embodiment adds two small triangles between the traditional front and rear triangles. A truss is a planar structure where slender members form adjoining triangles. The frame of the preferred embodiment, viewed from the side, forms a truss with a compressible member (shock absorber 36). This in-plane triangulation Gives the frame high strength for static in-plane loads, similar to a conventional diamond frame. The high strength of my frame configuration is further enhanced under dynamic loading by the shock absorption in the compressible member.

Shock absorber 38 resists, cushions, and damps compressire loads. The primary functions of the shock absorber are to support the compressire load and absorb bump energy. Commercial bicycle shock absorbers are available from several manufacturers and perform these functions in various ways. Since shock absorber 38 is pivotably connected to main frame 20 and swingarm 22 by upper shock mount 94 and lower shock mount 84, relative motion can occur between the main frame and swingarm.

Chainstays 78R and 78L, backstays 82R and 82L, and dropouts 80R and 80L perform their conventional functions of supporting rear axle 52 and serving as mounting points for the braking system, not shown, and rear derailleur 56. Pivot stays 76R, 76L, 88R, and 88L, along with strut 86 and shock absorber 36, complete the truss, providing a strong, stiff, lightweight structure. Viewed from the side, swingarm 22 has a diamond shape divided into two triangles, capable of supporting great loads.

Swingarm 22 is also well triangulated for out-of-plane loads and torsional loads between rear axle 52 and pivot shaft 24S. These loads are caused primarily by lateral forces on rear wheel 34. Good bracing for out-of-plane loads requires more than a simple truss structure, as detailed below.

Tetrahedron—FIG. 2

A tetrahedron is a pyramid-like solid with four triangular faces and six edges. A framework patterned along the six edges of a tetrahedron forms a basic three-dimensional, fully-triangulated structure. Loads on a tetrahedral framework produce tension or compression in the members, with minimal bending.

Swingarm 22 (FIG. 2) includes a tetrahedron formed between pivot shaft 24S (in phantom) and strut 88, with upper pivot stays 88R and 88L, and lower pivot stays 78R and 78L. These four stays prevent strut 86 from twisting or moving laterally with respect to pivot shaft 24S.

Another tetrahedron is formed between strut 86 and rear axle 52 with chainstays 78R and 78L and backstays 82R and 82L. These connected tetrahedral provide great torsional stiffness to the swingarm, thereby keeping the wheels in alignment. There is no need to rely on an upper guide to provide stiffness, thus facilitating the use of a simple elastomer spring for shock absorber 36 if desired.

Alternative Swingarm—FIG. 3

In alternative swingarm 23 of FIG. 3, longitudinal stay 92 is added to the left side of the swingarm, between pivot sleeve 24VL and dropout SOL. This stay forms a third tetrahadron, further increasing triangulation and lateral rigidity.

The high drivetrain efficiency of unsuspended bicycles is conserved, in both swingarms 22 and 23, by several key features. Pedal crankshaft housing 50 is well supported by strut 86, lower pivot stays 76R and 76L, and chainstays 78R and 78L. This keeps pedal crankshaft 40 in alignment with the rest of the bicycle. Also, this suspension system does not have a pivot between the pedal crankshaft housing and the rear axle. Chainstays 78R and 78L run directly from pedal crankshaft housing 50 to rear axle 52. This prevents flex and suspension motion from compromising drivetrain stiffness and efficiency.

The result of the high degree of triangulation is a suspended frame as rigid in lateral, torsional, and drivetrain loading as an unsuspended frame. This maintains high efficiency and precise handling with increased control and comfort.

In addition to the advantages obtained with a well-braced truss structure, the configuration of the preferred embodiment produces other formerly unappreciated advantages as explained in the following sections.

Figure 5:
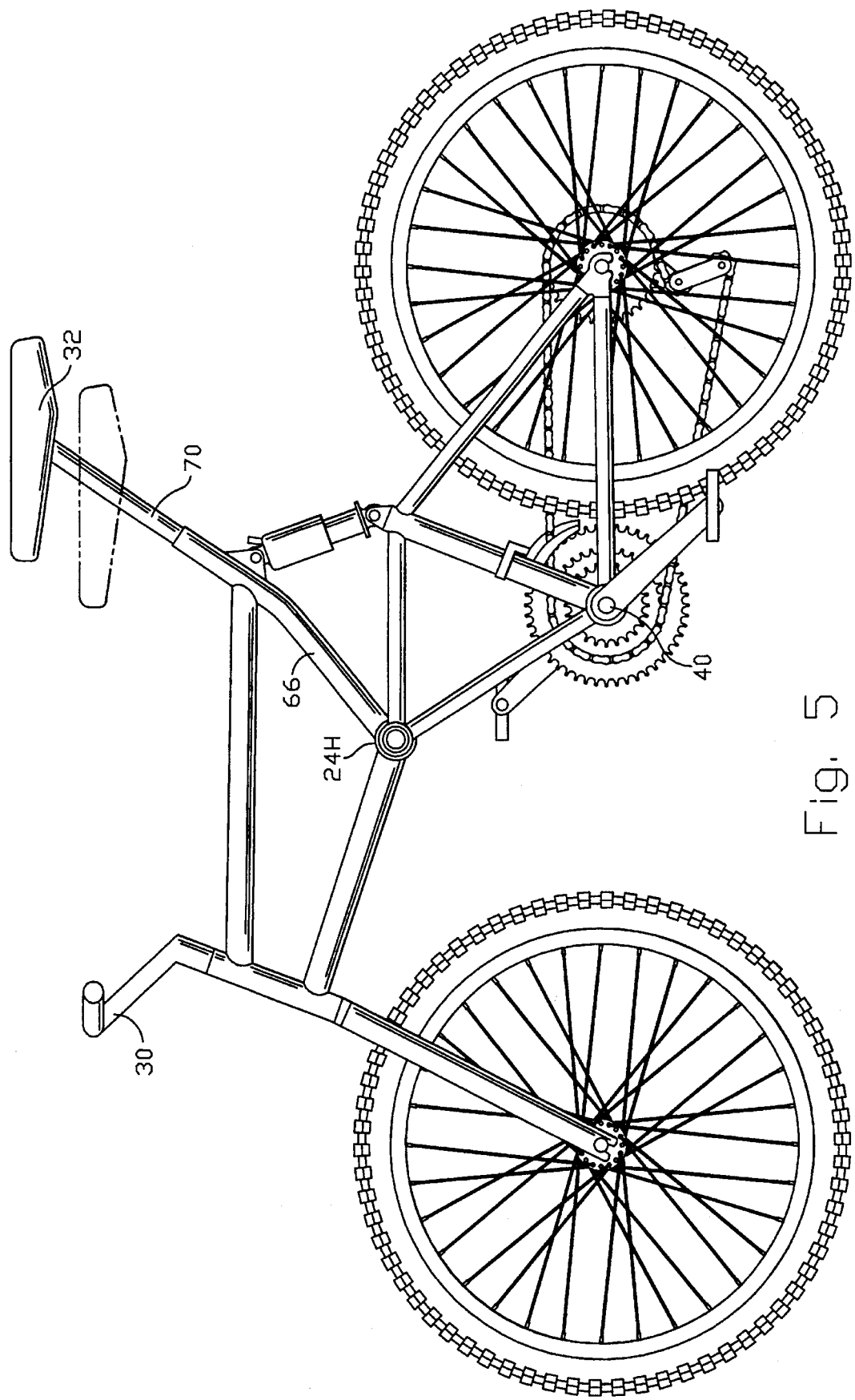
FIG. 5 is a side view showing how adjustment of seat height changes the effective frame geometry.

Geometry Considerations—Static—FIG. 5

A conventional diamond frame for a small rider typically has a shorter top tube and a steeper seat tube angle than a frame for a larger rider. This helps to comfortably position the rider on the bicycle.

It can be seen from FIG. 5 that in the preferred embodiment, seat 32 moves along a different axis than in a conventional frame, as seatpost 70 slides in and out of seat tube 68. Because the axis of the upper part of seat tube 66 is offset forward, instead of intersecting the pedal crankshaft housing as is common practice, advantages in frame sizing are realized. In the preferred embodiment, as the seat height is lowered to fit a smaller rider, seat 32 moves considerably closer to handlebars 30, and the pedal crankshaft-to-seat angle (commonly called the seat angle) steepans. This allows a given frame size to accommodate a wide range of rider sizes. When seat 32 is set high, the geometry mimics a large frame with a long frame length, thus fitting a large rider. When seat 32 is set low, the geometry mimics a small frame with a short length and steeper seat angle. Thus the effective frame length varies and fewer frame sizes are needed to accommodate a given range of rider sizes, enhancing manufacturability.

These benefits are achieved if the upper part of seat tube 66 is approximately 57 degrees from horizontal as shown. Alternatively, if a more traditional seat adjustment action is desired, the angle of bend in seat tube 66 can be increased to put the upper portion more in line with pedal crankshaft 40.

Figure 6:
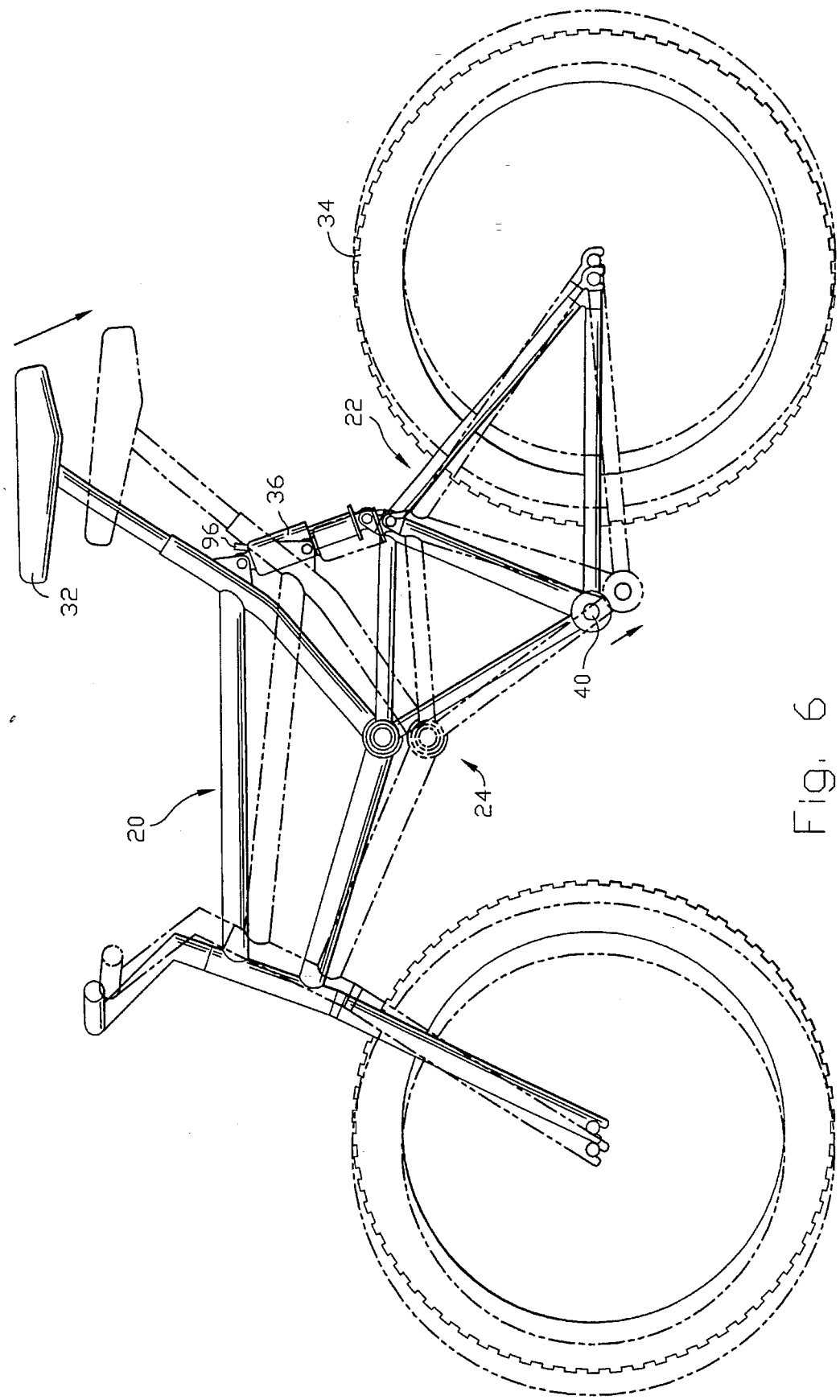
FIG. 6 is a similar view showing how frame geometry, seat height, and pedal crankshaft height change with suspension movement.

Geometry Considerations—Dynamic—FIG. 6

With this suspension system, there are also favorable geometry effects as the suspension acts. FIG. 6 shows the preferred embodiment with the suspension fully extended and, superimposed in phantom, fully compressed.

The location of the pivot in the preferred embodiment is such that the geometry changes advantageously as the suspension moves through its range of motion. When the suspension is extended, the geometry is suited to climbing, with steep seat and head angles, full leg extension, and high ground clearance. When compressed, seat and head angles slacken, seat 32 lowers relative to pedal crankshaft 40, pedal crankshaft 40 lowers slightly, and the wheelbase (spacing between the wheels) lengthens. This latter geometry is known as "fire road geometry" because it provides high-speed stability over rough surfaces, such as dirt fire roads in a forest.

The preferred location of the pivot produces a change in leg extension, or spacing between seat 32 and pedal crankshaft 40, approximately equal to the change in wheelbase. The favorable geometrical effects are achieved as long as the change in leg extension is 0.5 to 1.5 times the change in wheelbase, as the suspension moves through its range of motion.

The changes in geometry can be advantageous in several ways: When the suspension is compressed at the bottom of a dip, or hitting a bump, or in a hard corner, the changes in geometry provides increased stability.

Also if shock absorber 36 is designed to shorten in length during rough terrain or high-speed use, the bicycle geometry is automatically optimized. This may be a manual adjustment if, for example, the end fitting of the shock absorber is threaded and its length is adjusted to suit the terrain. Or if an air-charged shock absorber is used, the pressure can simply be lowered, via air valve 98, for rough downhills. Geometry can also be adjusted while underway if a rider-adjustable mechanism is employed.

A completely automatic adjustment can be achieved as follows: If an elastomer spring is used for the shock absorber, the use of what is known as a slow-recovery elastomer produces the desired effect. When the bicycle hits a particularly rough section of trail or a series of fast bumps, the elastomer shock absorber doesn't have enough time to recover and extend fully before hitting the next bump. This lowers the center of gravity, slackens head and seat angles, and lengthens the wheelbase until the trail smooths out.

Alternately, if an oil-dampened shock absorber is employed and the valving of shock absorber 36 is appropriately selected, the bicycle can also be made to self-adjust to the terrain. One way to achieve this is to increase the damping force on the rebound stroke when shock absorber 36 is extending. Again, when rough terrain or fast bumps are encountered, the shock does not have time to extend fully between bumps. In the motorcycle world, this phenomenon is known as "packing down" and is considered undesirable because less bump travel is available for the next bump. On my suspension bicycle, however, this phenomenon can be used to advantage because ample travel is available. When the suspension packs down on rough terrain, the geometry changes favorably and the center of gravity lowers, leading to increased stability. When the downhill ends, the suspension gradually extends to an aggressive climbing geometry. Future improvements in shock absorber technology may allow even more advantages in automatically adjusting geometry to be realized.

On the other hand, for smooth terrain, shock absorber 36 can be replaced by a rigid rod with adjustable length. Frame geometry is then adjustable by changing the rod length.

The careful placement of the swingarm pivot axis in the preferred embodiment provides all these favorable geometry effects without allowing the pedals to get too close to the ground. As is apparent from a consideration of FIG. 6, the height of pedal crankshaft 40 does not vary excessively as the suspension moves through its range of motion.

THEORY OF OPERATION

Bump Dynamics—FIGS. 4, 6

On an unsuspended bicycle, the rider must often stand when navigating rough terrain so that the bumps will be transmitted through the rider's legs, which can better absorb them, rather than directly into the torso. With my suspension, because seat 32 travels more than pedal crankshaft 40 as the suspension is compressed, several advantages accrue. As can be seen in FIG. 6, the distance between seat 32 and pedal crankshaft 40 varies. This allows the seated rider to absorb some bump energy with the legs without having to stand. Indeed when approaching a large bump, the rider can tense the leg muscles to brace for impact. This extends the suspension slightly, easing the impact. The flexing of the rider's muscles then helps to dampen the suspension response. This leg-damping effect facilitates the use of simple, lightweight, inexpensive spring, such as elastomers, which lack sufficient damping to be the sole source of damping.

A surprising observation is that after riding this suspension system for a while, the rider can learn to use the leg muscles to actively control the suspension over challenging terrain without even thinking about it. The swingarm becomes an extension of the rider's body, allowing improved control, comfort, and safety.

Figure 8:
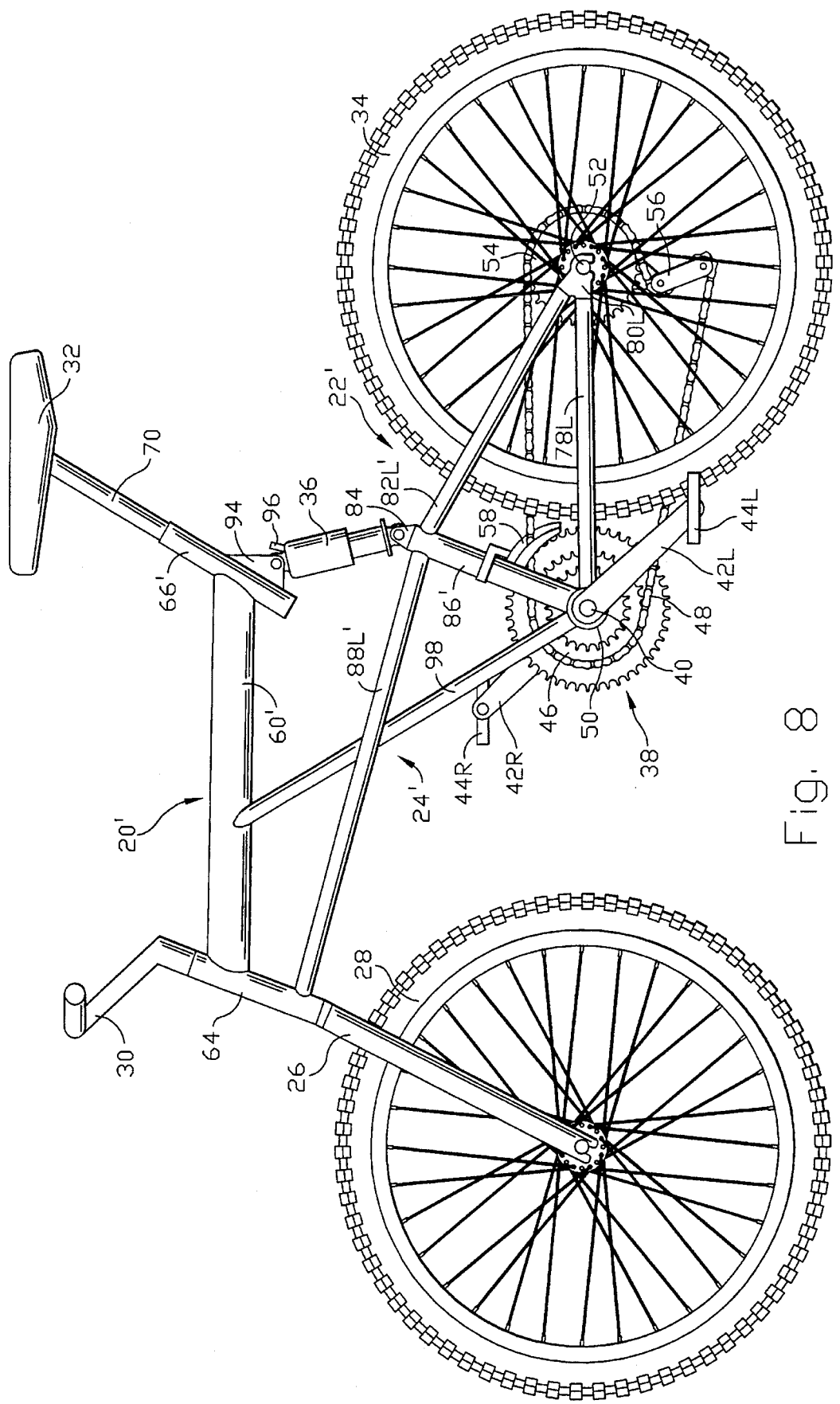
FIG. 8 shows a side view of an alternative embodiment of my invention, with a flexure-type pivot.

As can be appreciated from FIGS. 4 and 8, the sudden flexing of the rider's legs upon impact has another consequence: the reflex action of the leg muscles causes a brief tensing. This lifts the rider's body slightly, and pushes pedal crankshaft 40 down slightly. Pushing the pedal crankshaft downward in turn causes seat 32 to be urged downward. These effects tend to lessen shock forces transmitted to the seat.

One final related consequence of this suspension has to do with swingarm dynamics. Pivot 24 is located in front of the center of percussion of swingarm 22 for impacts transmitted through rear wheel 34. As a result, when wheel S4 is impacted upward, the pivot assembly is momentarily urged sharply downward on main frame 20. This downward shock force largely cancels any upward shock transmission through shock absorber 36 to seat 32, further improving the ride. The result of this dynamic action is that the seat will not slap the rider's posterior on sharp impacts.

Travel and Spring Rates—FIG. 6

This suspension system, with pedal crankshaft 40 mounted on swingarm 22 and a pivot location as described, has several useful features and advantages in the area of suspension travel and spring rates. Spring rate is the amount of force required per unit of travel. Referring again to FIG. 6, the fully extended, i.e. rider/ess, position is shown in solid lines. If the rear suspension is compressed while the bicycle is sitting on level ground, e.g. by pushing down on the seat, the vertical motion or travel of seat 32 is relatively large, as indicated by the adjacent arrow, while pedal crankshaft 40 moves a relatively small distance, as indicated by its adjacent arrow.

The maximum travel of a bicycle suspension must be limited to avoid having the pedals hitting the ground. Placing the pivot several centimeters forward of pedal crankshaft 40 as shown causes seat 32 to travel more than twice as far as the pedal crankshaft does. This in turn allows significantly more vertical seat travel before the pedals get too close to the ground, compared to most other suspension bicycles. The long travel obtainable with this system facilitates the use of smaller diameter wheels, if desired, lessening unsprung weight.

With the proportions as shown in FIG. 6, the vertical travel of seat 32 upon flexure of the frame is about 2.5 times the vertical travel of pedal crankshaft 40. For example, if seat 32 is pushed down 2.5 cm, crankshaft 40 will move down 1.0 cm. This will be referred to as a travel ratio of 2.5:1. A consequence of this arrangement is that the seat has much more leverage against the shock absorber spring, than the pedals do. Thus it is easier to compress the suspension by pushing on the seat than by pushing on the pedals. This has several implications which are important to achieving the objectives set forth previously.

A primary objective of my suspension system is to provide a suspension system which is soft when the rider is sitting, but firm when the rider is standing. The increased leverage of the seat means that the force required to start compressing the suspension, called preload, is significantly lower when the rider is sitting than when the rider is standing.

The firmness of a suspension system is largely determined by the spring rate, measured in force per unit of travel. Spring rate changes with leverage in an inverse-squared manner. Thus the increased leverage of the seat produces a softer spring rate when seated. With a travel ratio of 2.5:1, the spring rate measured at pedal crankshaft 40 is about 2.5 squared or six times as great as the spring rate measured at seat 32. Thus the suspension is firm when standing on the pedals, yet soft when sitting on the seat. In addition, the damping also increases greatly when standing.

These characteristics provide the seated rider with a soft, long-travel suspension, allowing the rider to relax, even over rough terrain. There is no need to keep the leg and back muscles tensed for bump absorption. The rider's energies can be concentrated on control and propulsion instead. Yet when the rider stands up, preload, shock damping, and spring rate all increase, providing lively, quick acceleration and climbing, without the bicycle sagging or wallowing during hard lunges at the pedals. cl Determination of Travel Ratio—FIG. 1

The travel ratio between seat 32 and pedal crankshaft 40 is determined by the fore/aft location of the pivot. In the preferred embodiment the travel ratio is approximately 2.5:1. Travel ratio can be computed as described next.

Referring once again to FIG. 1, the suspension is shown partly compressed on a horizontal surface, as under the weight of a rider. A distance D1 can be designated as the horizontal distance from the center of pivot 24 to the center of rear axle 52. A second distance D2 is the horizontal distance from pedal crankshaft 40 to rear axle 52. The amount which pivot shaft 24S overhangs crankshaft 40 can be described as an overhang ratio of D1/D2. This swingarm overhang ratio determines the vertical motion of pivot shaft 24S compared with the vertical motion of pedal crankshaft 40.

Similarly, a third distance D3 can be designated as the horizontal distance from the axle of front wheel 28 to the middle of seat 32. A fourth distance D4 is the horizontal distance from the axle of front wheel 28 to pivot shaft 24S. The overhang ratio of main frame 20 is D3/D4. This main frame overhang ratio relates the vertical motion of seat 32 to the vertical motion of pivot shaft 24S.

Finally now, the vertical travel ratio between seat 32 and pedal crankshaft 40 is the product of the swingarm overhang ratio and the main frame overhang ratio. This can be expressed as:

$$Travel\ Ratio = (D1/D2) \times (D3/D4)$$

For example, in FIG. 1, the swingarm overhang ratio is 1.4:1, and the main frame overhang ratio is 1.8:1. Thus the travel ratio is 1.4 times 1.8 or 2.5:1.

It should be noted that the overhang ratios, and hence the calculated travel ratio, change slightly as the suspension moves through its range of motion. Thus this method is not exact. However, using overhang ratios as described above is a simple and reasonably accurate method of calculating the travel ratio.

Optimum Travel Ratio—FIG. 1, 6

If the pivot is moved rearward of the location shown, distance D1 decreases and distance D4 increases. The travel ratio is thus lowered below 2.5:1. This lessens the available seat travel, and if lowered below 1.7:1, makes the suspension too soft when standing. Conversely, if the pivot is placed farther forward, the travel ratio increases. If it is increased too far, above about 4.0:1, the suspension will be too firm when standing for good absorption of bumps.

I have found, through experiment and calculation, that a travel ratio between 1.7:1 and 4.0:1 gives good performance, both sitting and standing. I believe the optimum travel ratio is between 2.0:1 and 3.0:1. The ratio shown is 2.5:1.

Since suspension firmness depends on the square of the leverage ratio, the range of travel ratio between 1.7:1 and 4.0:1 corresponds to a standing firmness three to sixteen times the sitting firmness, with the optimum being approximately four to nine times the sitting firmness.

With a travel ratio in the range of 1.7:1 to 4.0:1, an interesting and useful effect is exhibited. When the rider is seated, the soft spring rate provides a low suspension resonant frequency. This keeps the suspension from moving in response to the pedaling forces which occur at a higher frequency. If the resonant frequency were the same as the pedaling frequency, the suspension could become "excited" into a bobbing motion in the same way a playground swing exhibits large motions in response to small forces. When the rider is seated, the low resonant frequency of my suspension avoids this. Conversely, when the rider is standing, the cadence or pedaling frequency is typically lower than when sitting, but now the firmer spring rate provides a high resonant frequency. Again motion or excitation at resonance is avoided. The suspension firmness at the pedals must be at least three times the firmness at the seat to achieve this effect. This corresponds to a travel ratio of at least 1.7:1.

The intrinsic avoidance of resonance thus obtained combines synergistically with the force balancing described next to produce a system which is virtually immune to pedaling actuation, but which actively increases control and comfort.

Figure 7:
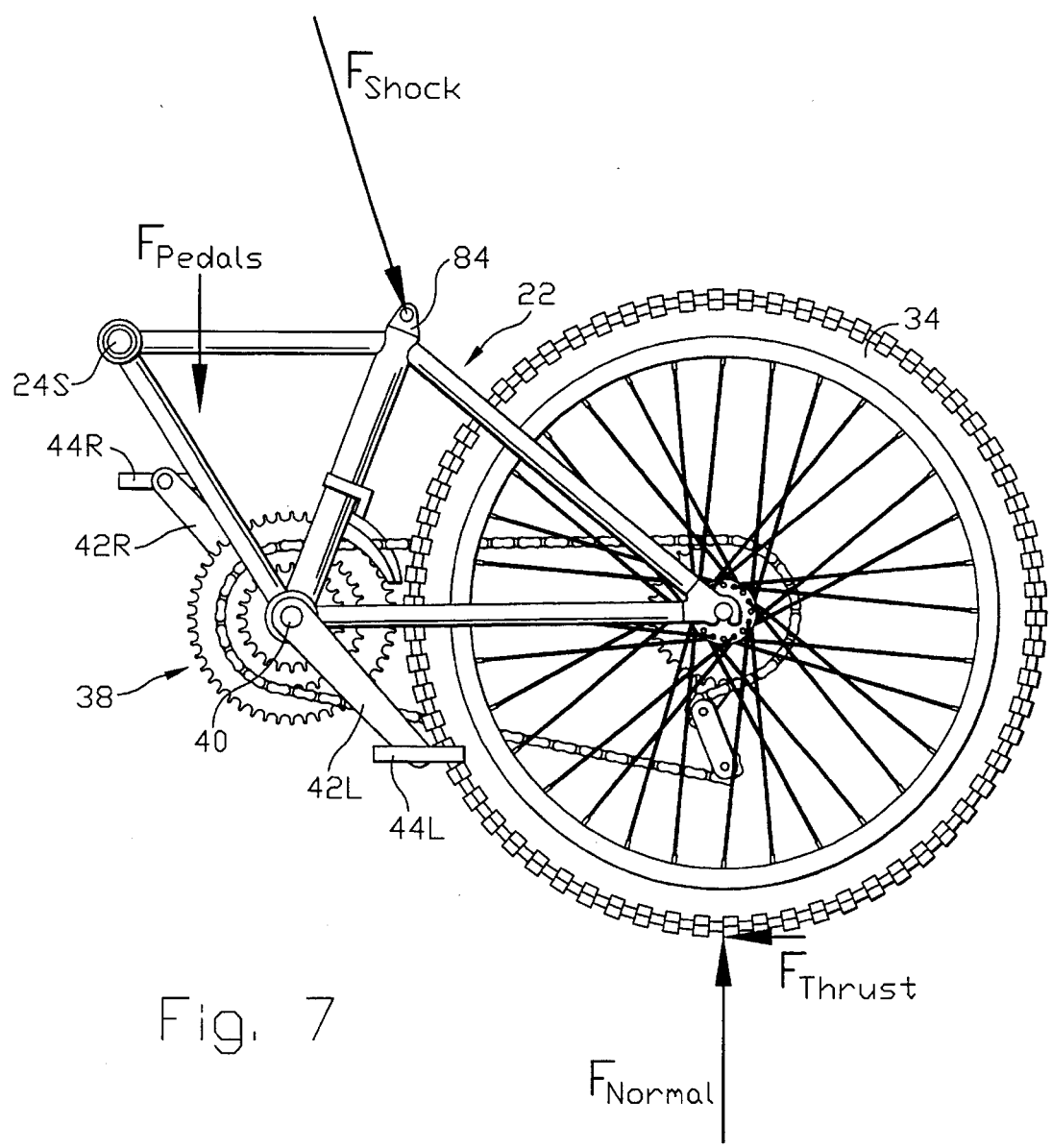
FIG. 7 is a free body diagram indicating the forces which affect anti-squat action.

Anti-Squat—FIG. 7

There is a range of possible pivot locations where overall performance is best. Performance considerations include anti-squat action while sitting, anti-squat action when standing, geometry, damping, travel, impact response, etc. Anti-squat action is determined primarily by the height of the pivot. The following section discusses sitting antisquat action, and how to achieve it no matter what gear is selected.

FIG. 7 shows the important forces acting on swingarm 22. For the purposes of this analysis, the swingarm, rear wheel 34, and pedal crankset 38 are considered to behave as a single free body. The only places where external forces are applied to this body are where rear wheel 34 contacts the ground, at lower shock mount 84, at pedals 44R and 44L, and at pivot shaft 24S. These forces produce torques on swingarm 22. If the torques are calculated about pivot shaft 24S, then the pivot force is immaterial since it produces no torque. This is why no pivot force is shown in FIG. 7. The only forces which need to be considered are at the tire, shock, and pedals. The pedal and tire forces vary during the pedal stroke. The goal, for anti-squat, is to find the pivot location where these variations substantially cancel so the shock force remains constant throughout the pedal stroke. Then the bicycle will not squat or rise when pedaled.

Tire Forces—FIG. 7

The force between the tire and the ground can be broken down into components parallel to the Ground and a component perpendicular or normal to the ground. If coasting on a smooth surface, the normal force, $F_{normal}$ (FIG. 7), is just the gravity load. This force tends to compress the suspension. When pedaling, however, there is a sine-wave-like variation added to the gravity load as will be explained below.

Force components parallel to the Ground arise from cornering, braking, and pedaling. For the purposes of anti-squat, the parallel component that is important is the tire thrust force, $F_{thrust}$. This propulsive force tends to extend the suspension.

When pedaling, the drive torque on pedal crankset assembly 38 varies cyclically. Generally the torque reaches a peak when crankarms 42R and 42L are just past horizontal and is at a minimum when the crankarms are approximately vertical. The pedaling torque, acting through the drivetrain, produces a cyclically varying thrust force at the rear tire's contact with the ground. Thus, even when a bicycle is ridden at approximately constant speed, it is alternately accelerating and decelerating slightly. When a vehicle is accelerating, there is a weight transfer from the front wheel(s) to the rear wheel(s). Thus the cyclically varying thrust force produces a sine-wave-like variation in normal force due to the effects of weight transfer.

Additionally, there is another cyclical normal force applied to the rear tire. This force is a reaction to the rider's body motions when pedaling. The rider's center of gravity moves up and down, especially when standing, which produces a reaction force at the tires. This force varies with riding style, pedaling speed and intensity, and generally is much larger when standing than when sitting. The body reaction force variations are approximately in phase with the weight transfer variations at the rear tire.

The result of all this is that the normal force on the rear tire, $F_{normal}$, is at a maximum in the middle of the pedal power stroke. This force peak tries to compress the suspension. An incorrectly designed suspension responds to this by squatting on each power stroke of the pedals.

The present suspension utilizes the tire thrust force, $F_{thrust}$, to balance the variations in normal force. This thrust force tends to extend the suspension on each power stroke, meaning it is out of phase with the normal force. By carefully selecting the height of the pivot, the forces can be made to cancel, producing substantially no squat.

Pedal Forces—FIG. 7

Since pedal crankshaft 40 (FIG. 7) is mounted directly on swingarm 22, there is one more cyclical force which must be included in the balance. The forces the rider exerts on pedals 44R and 44L are applied to swingarm 22. The forces on the left and right pedals can be combined into a single resultant force, $F_{pedals}$, whose approximate position is as depicted. This force applies a torque to swingarm 22. It has been found that this resultant line of force always passes very near a fixed point, throughout the pedal stroke. In General, this fixed point is approximately one half of a crankarm length forward of pedal crankshaft 40 and a little more than one crankarm length above the pedal crankshaft, as shown by the tip of the arrow in FIG. 7. The location of the point varies slightly depending on intensity of pedaling, but remains fixed throughout the power stroke. The resultant pedal force varies in strength and direction, but always acts approximately through this point.

Near the peak of the power stroke, this force is directed downward and slightly forward. Near the trough of the power stroke, the force is downward and slightly rearward, and the force magnitude is about 75% of its peak value. These variations in force magnitude and direction, acting on the short lever between the pivot and the above-mentioned fixed point, produce a cyclically varying torque on swingarm 22. This must also be balanced if undesirable motion is to be avoided. This torque can tend to either compress or extend the suspension, depending on the location of the pivot, and is minimized if the pivot is near the above-mentioned fixed point as it is in my suspension system. If the pivot is too far rearward, squat will occur in the higher Gears. If the pivot is too low, squat will occur in all Gears. If the pivot is placed at the "sweet spot" where all the forces balance the suspension will not react to pedaling inputs in any gear.

When the rider is coasting, the combined left and right pedal force passes directly through pedal crankshaft 40, which is some distance away from the pivot. This allows the rider to actively control and damp the rear suspension, as previously discussed, yet the suspension does not respond to pedaling.

In summary, the torques which must be balanced are due to tire forces and pedal forces. The sum of these torques must remain approximately constant throughout the pedal stroke to eliminate squat. For a Given frame size and Geometry, there is a unique pivot location which provides substantially complete balancing of these torques in all Gears. If the actual pivot is placed at or near this point, unwanted suspension response to pedaling will be minimized.

In the preferred embodiment, the pivot location has been selected to produce minimal response to pedaling inputs, whether the rider is sitting or standing. When the rider is seated, there is essentially complete balancing of torques. When the rider stands, any force due to increased body motion is resisted by the firmer spring rate and preload at the pedals, as discussed previously,. Thus anti-squat action is achieved sitting and standing, and regardless of gear selection.

The pivot location which provides anti-squat also provides what might be called anti-rise braking action. When the rear brake is applied, the same type of force balancing occurs, which tends to keep the suspension from extending or topping-out. This helps keep the suspension active under braking.

Ideal Pivot Location—FIG. 1

Returning now to FIG. 1, the ideal location for pivot 24 can now be fully specified. As previously discussed, the fore/aft pivot position is chosen to produce a ratio of vertical seat travel to vertical pedal crankshaft travel of between 1.7:1 and 4.0:1. The ideal pivot height is found by solving the torque balance described above. This must be evaluated for a variety of drive gear ratios, travel ratios, and frame sizes. The results indicate that if the travel ratio is in the range specified above, anti-squat action is substantially independent of drive gear selection. With a travel ratio as specified, the height of the pivot is the primary determinant of anti-squat action.

I have found, through experiment and calculation, that the preferred pivot height depends on the height of the center of gravity (CG) of the bicycle/rider combination in the following relation:

$$\text{Ideal Pivot Hr.(cm)} = (0.22 \times CG \text{ height}) + 35.65$$

Coincidentally, for a typical mountain bike riding position, the center of gravity height is almost exactly equal to the seat height. Thus seat height can be substituted in the above relation, providing a convenient way to describe the ideal pivot height.

Using the above relation, for a medium-sized frame with a seat height of approximately 102 cm, the ideal height for the pivot is approximately 58 cm above the ground. For a large frame with a seat height of approximately 129 cm, the ideal height is about 6 cm higher. For a small frame with a seat height of approximately 74 cm, the ideal height is about 6 cm lower. A variation from the ideal height of about 9 cm can be tolerated before anti-squat performance deteriorates significantly. Thus the range of pivot height which provides the benefits of this suspension is:

$$\text{Pivot Height Range} = 58 \pm 6 \pm 9 = 43 \text{ to } 73 \text{ cm}$$

This range allows for variations in frame size and seat height, while maintaining optimum performance.

If pivot 24 is located as described, anti-squat will be achieved in all gears and all riding positions.

Alternative Embodiment—FIG. 8

As mentioned previously, the pivot between the two frame portions can be a flexure or flex-pivot instead of a bearing system. A flexure is a piece of flexible material arranged to act as a hinge by bending. FIG. 8 shows an alternative embodiment of my suspension in which a flex-pivot assembly 24' has been integrated into the frame of the bicycle. The flexing or bending of the frame tubes in the central part of the frame accomplishes the pivoting function. This frame is similar to that of FIG. 1 with the following differences. An alternative main frame 20' has an enlarged top tube 60'. A shorter alternative seat tube 66' is connected to the rear end of top tube 60'. A flexure-mounted swingarm 22' has a shorter alternative strut 86' and a shorter alternative backstay 82L'.

Flex-pivot assembly 24' comprises a flexible upper stay 88L' and a flexible lower stay 98 arranged in an X pattern. Lower stay 98 is preferably a single tube which is attached to pedal crankshaft housing 50 at its bottom and to the middle of enlarged top tube 60' at its top. From the top of strut 86', flexible upper stay 88L' extends forwardly, around and past lower stay 98, then curves slightly inward to attach to head tube 64. Upper stay 88L' is preferably not rigidly attached to lower stay 98 where they cross. Backstay 82L' and upper stay 88L' are duplicated on the right side of the frame (not shown). Left upper stay 88L' and right upper stay (not shown) are close together at their ends and are spread apart in the middle to straddle lower stay 98.

Upper and lower stays are made from a flexible material such as steel or titanium tubing. With this arrangement, if wheel 34 is deflected upward, stays 88L' and 98 bend into arcs and swingarm 22' rotates about the point where the stays cross. This point, where the stays cross, is the pivot axis for this embodiment. If this crossing point is located as specified above, the advantages of my suspension will be enjoyed.

Several variations on this embodiment are possible. For example, upper stay 88L' and lower stay 98 can be made from oval-shaped tubing, oriented with the widest dimension from left to right, to increase suspension flexibility while also increasing lateral rigidity. Also they may be attached or linked together where they cross, which also increases lateral rigidity.

This embodiment is ideally suited to flexible frame materials, such as composites, high-strength steel, and titanium.

CONCLUSIONS, RAMIFICATIONS, AND SCOPE

In summary, this is the first bicycle suspension system to solve all the typical problems using a single pivot axis. No four-bar linkage is required to get full anti-squat action, as was previously thought. Anti-squat action is achieved in all gears and for all riding positions by placing the pivot so as to provide balancing of cyclical forces, and correct suspension stiffness characteristics. My suspension system also yields advantages in travel, spring rates, geometry, dynamics, and control. The swingarm structure combines high strength with light weight.

While my above description contains many specifictries, these should not be construed as limitations on the scope of the invention, but rather as an exemplification of preferred embodiments.

In addition to the embodiments already described, there are other minor variations in design and construction which may be embodied without departing from the full scope of the invention.

Many variations in the design of main frame 20 are possible. For example, the main frame can be a monotube design, with no top tube, or a hollow shell made from shaped sheet metal or composites. The main frame may even incorporate an integral front suspension system.

The structural advantages of my suspension system may be realized with alternative pivot locations. For example, the pivot may be moved down and rearward to optimize for downhill racing, where anti-squat is not important but a well-braced swingarm structure, as described, is very important.

As mentioned, the pivot mechanism can be replaced by a flex-pivot or flexure while keeping the swingarm's pivot axis or center of rotation in the desired location. The flex-pivot can be built into the framework as has been described or it may simply be a flexible plate spanning between swingarm 22 and main frame 20.

The swingarm may also have alternative embodiments. For example, right and left upper pivot stays 88R and 88L may be replaced with a single larger tube for ease of manufacture, without excessive loss of rigidity. The same is true for lower pivot stays 78R and 78L. Another option is to locate lower shock mount 84 in line with rear axle 52 and pivot shaft 24S. Then, instead of a diamond shape, the side view of swingarm 22 describes a large triangle divided into two triangles.

If a pull-type shock absorber is used, it can be relocated below the frame and connected between pedal crankshaft housing 50 and the forward portion of down tube 62, thus maintaining a truss structure.

Another alternative is that a linkage connection can be made between the swingarm and either the front suspension or the front brake system to provide anti-pitch action if desired.

My suspension system can also be used to advantage on other types of bicycles. For example it will allow smaller, lighter, more aerodynamic wheels to be used on a racing bicycle. The pivot can be incorporated into the folding mechanism of a commuter bicycle with small wheels. Other uses are possible.

Accordingly, the scope of the invention should be determined not by the embodiments illustrated, but by the appended claims and their legal equivalents.

I claim:

1. A bicycle with enhanced shock-absorbing capabilities comprising:

a frame having front and rear wheels pivotably mounted thereon, said front and rear wheels being spaced apart in a fore-and-aft direction, said wheels being mounted to rotate parallel to a fore-and-aft vertical plane when said bicycle is traveling in a straight line, said frame having a main or forward frame portion, said front wheel being pivotably mounted upon said main frame portion, a bicycle seat being mounted atop said main frame portion, said frame having a rear or swingarm frame portion comprising at least one approximately tetrahedral shape, said rear wheel being mounted upon said swingarm frame portion, a pedal crankset assembly being mounted upon said swingarm frame portion, means for flexibly connecting said swingarm frame portion to said main frame portion so that said swingarm frame portion can swing, with respect to said main frame portion, about a pivot axis perpendicular to said fore-and-aft plane, the height of said pivot axis being between 43 and 73 cm above ground when said wheels rest upon ground, the fore-and-aft location of said pivot axis being such as to produce a vertical travel of said seat between 1.7 and 4.0 times the vertical travel of said pedal crankset assembly in response to movement of said swingarm frame portion with respect to said main frame portion while both of said wheels are in contact with level ground, whereby said bicycle will have improved anti-squat characteristics.

2. The bicycle of claim 1 wherein said means for flexibly connecting said swingarm frame portion to said main frame portion includes at least one swingarm bearing mounted at said pivot axis.

3. The bicycle of claim 1 wherein said means for flexibly connecting said swingarm frame portion to said main frame portion includes at least one flexible member arranged so that said swingarm frame portion can swing, with respect to said main frame portion, about said pivot axis.

4. The bicycle of claim 1 wherein said seat slideably engages said main frame portion at an angle of approximately 57 degrees from level, whereby the effective length of said main frame portion increases as said seat is raised.

5. The bicycle of claim 1, further including a shock absorber mounted between said swingarm frame portion and said main frame portion, whereby the relative motion of said frame portions is controlled.

6. The bicycle of claim 5, further including means for shortening the length of said shock absorber, whereby a more stable frame geometry can be achieved during rough terrain use.

7. The bicycle of claim 1 wherein said main frame portion includes a seat tube, said seat tube having a seat tube axis, said bicycle seat being arranged to slideably engage said seat tube along said seat tube axis, said seat tube axis being offset forward of the center of said pedal crankset assembly, whereby the effective length of said main frame portion increases as said seat is raised.

8. The bicycle of claim 1 wherein the fore-and-aft location of said pivot axis is such as to produce a vertical travel of said seat which is substantially 2.5 times the vertical travel of said pedal crankset assembly in response to movement of said swingarm frame portion with respect to said main frame portion while both of said wheels are in contact with level ground, whereby the anti-squat characteristics are optimum for pedaling in all riding positions.

9. The bicycle of claim 1 wherein the fore-and-aft location of said pivot axis is such as to produce a vertical travel of said seat which is substantially 1.7 times the vertical travel of said pedal crankset assembly in response to movement of said swingarm frame portion with respect to said main frame portion while both of said wheels are in contact with level ground, whereby the suspension is compliant when riding downhill on rocky terrain in a standing position, yet avoids pedal induced resonance under all conditions.

10. A bicycle with enhanced shock-absorbing capabilities comprising:

a frame having front and rear wheels pivotably mounted thereon, said front and rear wheels being spaced apart in a fore-and-aft direction, said wheels being mounted to rotate parallel to a fore-and-aft vertical plane when said bicycle is traveling in a straight line, said frame having a main or forward frame portion, said front wheel being pivotably mounted upon said main frame portion, a bicycle seat being mounted atop said main frame portion, said frame having a rear or swingarm frame portion, said rear wheel being mounted upon said swingarm frame portion, a pedal crankset assembly being mounted upon said swingarm frame portion, means for flexibly connecting said swingarm frame portion to said main frame portion so that said swingarm frame portion can swing, with respect to said main frame portion, about a pivot axis perpendicular to said fore-and-aft plane, the height of said pivot axis being such as to produce a shortening of the spacing between said seat and said pedal crankset assembly between 0.5 and 1.5 times the change in spacing between said wheels in response to movement of said swingarm frame portion with respect to said main frame portion while both of said wheels are in contact with level ground.

the fore-and-aft location of said pivot axis being such as to produce a vertical travel of said seat between 1.7 and 4.0 times the vertical travel of said pedal crankset assembly in response to movement of said swingarm frame portion with respect to said main frame portion while both of said wheels are in contact with level ground, whereby the stability of said bicycle on rough terrain is increased by a lowering of the height of said pedal crankset assembly, a simultaneous shortening of the spacing between said seat and said pedal crankset assembly, and a simultaneous lengthening of the spacing between said wheels.

11. The bicycle of claim 10 wherein said means for flexibly connecting said swingarm frame portion to said main frame portion includes at least one swingarm bearing mounted at said pivot axis.

12. The bicycle of claim 10 wherein said means for flexibly connecting said swingarm frame portion to said main frame portion includes at least one flexible member arranged so that said swingarm frame portion can swing, with respect to said main frame portion, about said pivot axis.

13. The bicycle of claim 10 wherein said seat slideably engages said main frame portion at an angle of approximately 57 degrees from level, whereby the effective length of said main frame portion increases as said seat is raised.

14. The bicycle of claim 10, further including a shock absorber mounted between said swingarm frame portion and said main frame portion, whereby the relative motion of said frame portions is controlled.

15. The bicycle of claim 14, further including means for shortening the length of said shock absorber, whereby a more stable frame geometry can be achieved during rough terrain use.

16. The bicycle of claim 10 wherein said main frame portion includes a seat tube, said seat tube having a seat tube axis, said bicycle seat being arranged to slideably engage said seat tube along said seat tube axis, said seat tube axis being offset forward of the center of said pedal crankset assembly, whereby the effective length of said main frame portion increases as said seat is raised.

17. A bicycle with enhanced shock-absorbing capabilities comprising:

a frame having front and rear wheels pivotably mounted thereon, said front and rear wheels being spaced apart in a fore-and-aft direction, said wheels being mounted to rotate parallel to a fore-and-aft vertical plane when said bicycle is traveling in a straight line, said rear wheel having a rear wheel axle, said frame having a main or forward frame portion, said front wheel being pivotably mounted upon said main frame portion, said frame having a rear or swingarm frame portion, said swingarm frame portion having forwardmost and rearwardmost ends, said rear wheel axle being affixed to said rearwardmost end of said swingarm frame portion, said rear wheel being mounted to rotate about said rear wheel axle, a pivot assembly connecting said forwardmost end of said swingarm frame portion to said main frame portion so that said swingarm frame portion can swing, with respect to said main frame portion, about a pivot axis perpendicular to said fore-and-aft plane, said pivot assembly having left and right ends, said swingarm frame portion comprising:

only one upright strut situated directly in front of said rear wheel and dividing said swingarm frame portion into a forward subportion and a rearward subportion, said forward and rearward subportions sharing a common side formed by said strut, said strut having upper and lower ends, a pedal crankset assembly rigidly attached to said lower end of said strut, a pair of substantially bilaterally symmetric chainstays rigidly attached to said pedal crankset assembly and extending rearwardly to the ends of said rear wheel axle, a pair of bilaterally symmetric backstays rigidly attached to said strut near said upper end and extending rearwardly to the ends of said rear wheel axle, a pair of bilaterally symmetric upper pivot stays rigidly attached to said strut near said upper end and extending forwardly to said left and right ends of said pivot assembly, a pair of bilaterally symmetric lower pivot stays rigidly attached to said pedal crankset assembly and extending forwardly and upwardly, and diverging from each other, and attached to said left and right ends of said pivot assembly, such that both ends of said strut are connected to both ends of said pivot assembly to form said forward subportion of said swingarm frame portion such that said forward swingarm subportion has an approximately tetrahedral shape, and both ends of said strut are also connected to both ends of said rear wheel axle to form said rearward subportion of said swingarm frame portion such that said rearward subportion has an approximately tetrahedral shape, whereby said pedal crankset assembly will resist lateral flexing and said rear wheel will resist torsional flexing so as to provide a frame which is approximately as rigid as a conventional unsuspended bicycle frame.

18. The bicycle of claim 17 wherein the height of said pivot axis is between 43 and 73 cm above ground when said wheels rest upon ground, whereby anti-squat characteristics are achieved for a sitting rider.

19. The bicycle of claim 17, further including a bicycle seat mounted atop said main frame portion and wherein the fore-and-aft location of said pivot axis is such as to produce a vertical travel of said seat between 1.7 and 4.0 times the vertical travel of said pedal crankset assembly in response to movement of said swingarm frame portion with respect to said main frame portion while both of said wheels are in contact with level ground, whereby anti-squat characteristics are achieved for a standing rider.

20. The bicycle of claim 17, further including a bicycle seat mounted atop said main frame portion and wherein the height of said pivot axis is such as to produce a shortening of the spacing between said seat and said pedal crankset assembly between 0.5 and 1.5 times the change in spacing between said wheels in response to movement of said swingarm frame portion with respect to said main frame portion while both of said wheels are in contact with level ground, whereby the stability of said bicycle on rough terrain is increased by a shortening of the spacing between said seat and said pedal crankset assembly and a simultaneous lengthening of the spacing between said wheels.

21. The bicycle of claim 17 wherein said swingarm frame portion includes a pair of bilaterally symmetric combined stays, each of said combined stays having a forward and upper segment and a rearward and lower segment, said pair of upper pivot stays being formed by said forward and upper segment, and said pair of backstays being formed by said rearward and lower segment of said pair of combined stays, whereby the cost of frame construction is reduced.

22. The bicycle of claim 17, further including a bicycle seat mounted atop said main frame portion, and wherein said main frame portion includes a seat tube, said seat tube having a seat tube axis, said bicycle seat being arranged to slideably engage said seat tube along said seat tube axis, said seat tube axis being offset forward of the center of said pedal crankset assembly, whereby the effective length of said main frame portion increases as said seat is raised.

23. A bicycle with enhanced shock absorbing capabilities comprising:

a frame having front and rear wheels pivotably mounted thereon, said front and rear wheels being spaced apart in a fore-and-aft direction, said wheels being mounted to rotate parallel to a fore-and-aft vertical plane when said bicycle is traveling in a straight line, said frame having a main or forward frame portion, said front wheel being pivotably mounted upon said main frame portion, said frame having a rear or swingarm frame portion, said rear wheel being mounted upon said swingarm frame portion, said swingarm frame portion comprising:
only one upright strut dividing said swingarm frame portion into a forward triangular subportion and a rearward triangular subportion, said forward and rearward triangular subportions sharing a common side formed by said strut,
a plurality of forward elongated members extending forwardly from the ends of said strut and forming said forward triangular subportion, and
a plurality of rearward elongated members extending rearwardly from the ends of said strut and forming said rearward triangular subportion, said swingarm frame portion being flexibly connected to said main frame portion at the forwardmost end of said swingarm frame portion so that said swingarm frame portion can swing, with respect to said main frame portion, about a pivot axis perpendicular to said fore-and-aft plane, a bicycle seat mounted atop said main frame portion and a pedal crankset assembly mounted to the bottom end of said strut, the height of said pivot axis being such as to produce a shortening of the spacing between said seat and said pedal crankset assembly between 0.5 and 1.5 times the change in spacing between said wheels in response to movement of said swingarm frame portion with respect to said main frame portion while both of said wheels are in contact with level ground, whereby the stability of said bicycle on rough terrain is increased by a shortening of the spacing between said seat and said pedal crankset assembly and a simultaneous lengthening of the spacing between said wheels.

* * * * *

UNITED STATES PATENT AND TRADEMARK OFFICE
CERTIFICATE OF CORRECTION

PATENT NO. : 5,474,318            Page 1 of 3
DATED     : Dec. 12, 1995
INVENTOR(S) : John P. Castellano It is certified that error appears in the above-indentified patent and that said Letters Patent is hereby corrected as shown below:

Col. 3, line 62, change "NO" to —No.—

Col. 4, line 23, change "etal." to —et al.—

Col. 7, l. 1, change "80" to —30—.

Col. 7, l. 3, change "382" to —32—.

Col. 7, l. 7, change "84" to —34—.

Col. 7, l. 9, change "86" to —36—.

Col. 7, ll. 12 and 17, change "88" to —38—.

Col. 7, ll. 13 and 21, change "84" to —34—.

Col. 7, l. 38, change "80" to —60—.

Col. 7, l. 39, change "68" to —66—.

Col. 7, ll. 42 and 45, change "84" to —64—.

Col. 7, l. 57, change "88" to —66—.

Col. 9, l. 31, change "SOL" to —80L—.

Col. 10, l. 26, change "58" (first occur.) to —56—.

Col. 10, l. 32, change "84" to —34—.

Col. 11, l. 31, change "82" to —62—.

Col. 11, ll. 31 and 36, change "88" to —66—

Col. 11, l. 37, change "82" to —62—.

Col. 11, line 63, change "Gives" to —gives—

Col. 12, l. 1, change "38" to —36—

Col. 12, ll. 2 and 3, change "compressire" to —compressive—.

UNITED STATES PATENT AND TRADEMARK OFFICE
CERTIFICATE OF CORRECTION

PATENT NO. : 5,474,318
DATED : Dec. 12, 1995
INVENTOR(S) : John P. Castellano

It is certified that error appears in the above-indentified patent and that said Letters Patent is hereby corrected as shown below:

Col. 12, l. 6, change "38" to —36—.

Col. 12, l. 35, change "88" to —86—.

Col. 12, l. 36, change "78R" to —76R—.

Col. 12, l. 37, change "78L" to —76L—.

Col. 12, l. 51, change "SOL" to —80L—

Col. 13, line 18, change "68" to —66—

Col. 13, line 24, change ")steepens" to —steepens—.

Col. 14, line 9, change "98" to —96—.

Col. 15, line 11, change "4 and 8" to —4 and 6—.

Col. 15, line 22, change "S4" to —34—.

Col. 15, line 37, change "rider/ess" to —riderless—

Col. 16, lines 24-25, delete "cl Determination of Travel Ratio—FIG. 1" and substitute a heading on a new line as follows: —Determination of Travel Ratio—FIG. 1—

Col. 17, line 45, change "antisquat" to —anti-squat—.

Col. 17, line 67, change "Ground" to —ground—

Col. 18, line 7, change "Ground" to —ground—

Col. 18, line 57, change "General" to —general—

Col. 19, line 12, change "Gears" to —gears— (two occurrences)—.

Col. 19, line 14, after "balance" insert —,—

Col. 19, line 25, change "Given" to —given—

Col. 19, line 26, change "Geometry" to —geometry—

UNITED STATES PATENT AND TRADEMARK OFFICE
CERTIFICATE OF CORRECTION

PATENT NO. : 5,474,318  
DATED : Dec. 12, 1995  
INVENTOR(S) : John P. Castellano It is certified that error appears in the above-indentified patent and that said Letters Patent is hereby corrected as shown below:

Col. 19, line 28, change "Gears" to —gears—

Col. 19, line 66, change "Hr." to —Ht.—.

Col. 21, line 47, change "78R and 78L" to —76R and 76L—.

Col. 23, l. 29, after "portion" insert —comprising at least one approximately tetrahedral shape—.

Signed and Sealed this

Twenty-seventh Day of February, 1996

Attest:

BRUCE LEHMAN

Attesting Officer      Commissioner of Patents and Trademarks

REEXAMINATION CERTIFICATE (3406th)
United States Patent [19]

Castellano

[11] B1 5,474,318
[45] Certificate Issued    Dec. 30, 1997

[54] LONG-TRAVEL REAR SUSPENSION SYSTEM FOR BICYCLES

[76] Inventor: John P. Castellano, 1509 Liberty St., El Cerrito, Calif. 94530

Reexamination Request:
No. 90/004,449, Nov. 12, 1996

Reexamination Certificate for:
Patent No.: 5,474,318
Issued: Dec. 12, 1995
Appl. No.: 121,607
Filed: Sep. 15, 1993

Certificate of Correction issued Feb. 27, 1996.

[51] Int. Cl.$^6$ ............................................. B62K 25/04
[52] U.S. Cl. ............................................. 280/284; 280/227
[58] Field of Search ......................... 280/281.1, 284, 280/220, 283, 275, 278, 274; 180/227

[56] References Cited

U.S. PATENT DOCUMENTS 5,356,165  10/1994  Kulhawik et al. .................. 280/275

FOREIGN PATENT DOCUMENTS 446263   6/1949   Italy.

*Primary Examiner*—Kevin Hurley

[57] ABSTRACT

An improved bicycle rear suspension system comprises a main frame (20) and a swingarm (22), the former having a seat (32) and the latter having a rear wheel (34) and a pedal crankset assembly (38) mounted on it. The suspension has predetermined proportions which provide long travel, or bump absorbing motion, without exhibiting pedaling-induced motion. The swingarm (22) is hinged to the main frame (20) at a single pivot axis (24). The specified location of the pivot axis is such that the suspension is several times firmer when the rider is standing than when the rider is sitting. This pivot location also ensures that the pedaling forces applied to the swingarm (22) are substantially balanced throughout the pedal stroke. This mechanism also provides a frame geometry which can adjust to different terrain conditions. A lightweight structure for the swingarm (22) provides high strength and stiffness. The swingarm (22), when viewed from the side, presents a diamond shape divided into a plurality of triangles. The forward vertex of the diamond is at the pivot axis, and the rearward vertex is at rear axle (52). The pedal crankset assembly (38) is mounted at the bottom vertex of the swingarm (22) and a shock absorber (36) is attached to the top. The swingarm (22) with a shock absorber (36) and a seat tube (66) forms a truss structure which provides high strength and stiffness, yet is lightweight and easy to manufacture.

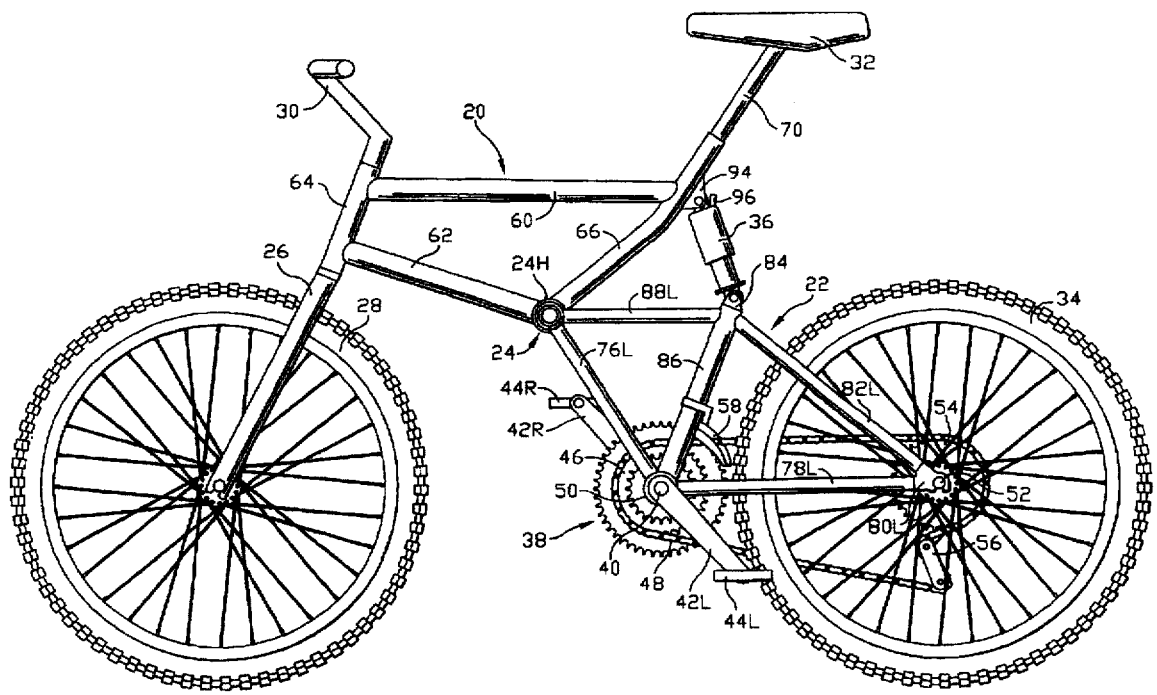

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–23 is confirmed.

* * * * *